US012780486B2

(12) United States Patent
Spahlinger

(10) Patent No.: US 12,780,486 B2
(45) Date of Patent: Nov. 3, 2026

(54) CARTON WITH LOCKING FEATURES

(71) Applicant: GPI Frankfurt & Augsburg GmbH, Kriftel (DE)

(72) Inventor: Carolin Spahlinger, Hattersheim am Main (DE)

(73) Assignee: GPI Frankfurt & Augsburg GmbH, Kriftel (DE)

( * ) Notice: Subject to any disclaimer, the term of this patent is extended or adjusted under 35 U.S.C. 154(b) by 84 days.

(21) Appl. No.: 18/220,881

(22) Filed: Jul. 12, 2023

(65) Prior Publication Data

US 2024/0017874 A1 Jan. 18, 2024

(30) Foreign Application Priority Data

Jul. 12, 2022 (DE) ......................... 202022103909.7

(51) Int. Cl.
*B65D 5/32* (2006.01)
*B31B 50/73* (2017.01)
(Continued)

(52) U.S. Cl.
CPC ............ *B65D 5/328* (2013.01); *B31B 50/732* (2017.08); *B65D 5/321* (2013.01); *B65D 5/4266* (2013.01);
(Continued)

(58) Field of Classification Search
CPC ...... B65D 5/328; B65D 5/321; B65D 5/4266; B65D 2215/02; B65D 2215/06;
(Continued)

(56) References Cited

U.S. PATENT DOCUMENTS

| | | | |
|---|---|---|---|
| 200,401 | A | 2/1878 | Knapp |
| 1,048,577 | A | 12/1912 | Avern, Jr. |

(Continued)

FOREIGN PATENT DOCUMENTS

| | | | |
|---|---|---|---|
| AT | 334276 B | 1/1976 | |
| CH | 412695 | 4/1966 | |

(Continued)

OTHER PUBLICATIONS

International Search Report and Written Opinion for PCT/US2023/027438 dated Nov. 7, 2023.

(Continued)

*Primary Examiner* — Christopher R Demeree
(74) *Attorney, Agent, or Firm* — Andrew N. Claerbout; FisherBroyles, LLP

(57) ABSTRACT

A carton comprising an inner construct that can comprise a plurality of inner panels extending at least partially around a first interior. The inner construct can comprise first and second inner locking tab. An outer construct can comprise a plurality of outer panels extending at least partially around a second interior. The inner construct can be at least partially received in the second interior. The outer construct can comprise first and second outer locking tabs. The second inner locking tab and the second outer locking tab can cooperate to limit movement between the constructs in a closed configuration, and, when the second inner locking tab has been disengaged from the second outer locking tab, the inner construct and/or the outer construct can be movable from the closed configuration to an intermediate configuration in which the first inner locking tab and the first outer locking tab cooperate to limit movement between the constructs.

30 Claims, 9 Drawing Sheets

(51) Int. Cl.
*B31B 105/00* (2017.01)
*B31B 110/35* (2017.01)
*B31B 120/10* (2017.01)
*B31B 120/30* (2017.01)
*B65D 5/42* (2006.01)

(52) U.S. Cl.
CPC ... *B31B 2105/0022* (2017.08); *B31B 2110/35* (2017.08); *B31B 2120/10* (2017.08); *B31B 2120/302* (2017.08)

(58) Field of Classification Search
CPC . B65D 5/685; B65D 5/38; B65D 5/22; B65D 5/6608; B65D 2251/1066; B65D 7/10
USPC ...... 229/122.32, 125.26, 125.28, 102, 160.2, 229/117.17, 125.125, 125.27, 145; 206/807, 815, 1.5; 220/345.3
See application file for complete search history.

(56) References Cited

U.S. PATENT DOCUMENTS 1,130,271 A 3/1915 Hammond
1,253,489 A 1/1918 Houghland
1,664,308 A 3/1928 Miller
1,951,274 A 3/1934 Denman
2,054,596 A 9/1936 Latimer
2,069,281 A 2/1937 Sebreny
2,180,808 A 11/1939 Jacobstein
2,194,220 A 3/1940 Elder
2,251,283 A 8/1941 Johnson
2,331,754 A 10/1943 Wohlers
2,335,363 A 11/1943 Shelton
2,369,387 A 2/1945 Marshall
2,396,310 A 3/1946 Yungblut
2,474,523 A 6/1949 Reynolds
2,559,320 A * 7/1951 Rushing ................. B65D 5/685 229/125.26
2,579,346 A 12/1951 Per
2,610,770 A 9/1952 Penfield
2,745,589 A 5/1956 Daly
2,777,630 A * 1/1957 Moberger .......... B65D 43/0222 229/125.28
D179,932 S 3/1957 Currie
D179,933 S 3/1957 Currie
2,836,343 A 5/1958 Will
2,877,736 A 3/1959 Simmons
2,898,004 A 8/1959 Klausmann et al.
2,899,123 A 8/1959 Currie, Jr.
2,943,769 A 7/1960 Klausmann
2,970,742 A 2/1961 Fleisig
2,975,952 A 3/1961 Tamarin
2,980,540 A 4/1961 Turpin
2,983,424 A 5/1961 Glass
3,033,436 A 5/1962 Peimer
3,040,953 A 6/1962 Tindall
3,049,282 A 8/1962 Chidsey, Jr.
3,055,362 A 9/1962 Huybert
3,057,524 A 10/1962 Shanks
3,071,882 A 1/1963 Eisman
3,099,381 A 7/1963 Meyers
3,114,474 A 12/1963 Davis
3,116,007 A 12/1963 D Esposito
3,166,229 A 1/1965 Sherman et al.
3,187,961 A 6/1965 Moore
3,205,603 A 9/1965 Brumley
3,235,144 A 2/1966 Pitkin et al.
3,240,419 A 3/1966 Spiering
3,269,531 A 8/1966 Weiss
3,298,576 A 1/1967 Sellors
3,302,847 A 2/1967 Hennesey
3,310,222 A 3/1967 Buttery
3,347,446 A 10/1967 Guyer et al.
3,366,496 A 1/1968 Bomar
RE26,557 E 3/1969 Houston
3,441,002 A 4/1969 Lawalin et al.
3,512,699 A 5/1970 Wilson
3,533,547 A 10/1970 Houston
3,563,449 A 2/1971 Forbes, Jr.
3,692,231 A * 9/1972 Neitzke .................. B65D 5/685 206/815
3,741,387 A 6/1973 Whitecar
3,804,321 A 4/1974 Forbes, Jr.
3,831,833 A 8/1974 Dressler et al.
3,888,350 A 6/1975 Horvath
3,894,680 A 7/1975 Araki
3,894,681 A 7/1975 Arneson
3,899,121 A 8/1975 Herbetko
3,910,487 A 10/1975 Jaeschke
3,921,862 A 11/1975 Holmstrom
3,958,744 A 5/1976 Herglotz
3,971,505 A 7/1976 Ohkubo
3,981,434 A 9/1976 Ramich
4,004,691 A 1/1977 Wihksne
4,053,100 A 10/1977 Baptist
4,076,117 A 2/1978 Wisdom
4,081,128 A 3/1978 O'Neill
4,083,455 A 4/1978 Keating, Jr.
4,094,456 A 6/1978 Raccoforte
4,102,457 A 7/1978 Meyers
4,111,351 A 9/1978 Forbes, Jr.
4,113,086 A 9/1978 Forbes, Jr.
4,138,016 A 2/1979 Roccaforte
4,141,485 A 2/1979 Lambert
4,155,449 A 5/1979 Bryne
4,196,483 A 4/1980 Kahl, Jr.
4,196,843 A 4/1980 Garmon
4,197,985 A 4/1980 Austin
4,201,329 A 5/1980 Rccaforte
4,261,483 A 4/1981 Dutcher
4,279,373 A 7/1981 Montealgre
4,304,355 A 12/1981 Sykora
4,341,338 A 7/1982 Arnold
4,342,417 A 8/1982 Forbes, Jr.
4,361,270 A 11/1982 Roccaforte
4,401,210 A 8/1983 Anjou
4,441,648 A 4/1984 Portsmouth
4,472,896 A 9/1984 Brauner
4,531,669 A 7/1985 Osborne
4,550,834 A 11/1985 Fletcher
4,609,142 A 9/1986 Adamek
4,630,733 A 12/1986 Fear
4,684,023 A 8/1987 Cortopassi
4,717,070 A 1/1988 Tabug
4,812,704 A 3/1989 Van Der Ven
4,834,255 A 5/1989 Boots
4,892,247 A 1/1990 Dirksing
4,901,457 A 2/1990 Chandler
5,040,722 A 8/1991 Fromion
5,050,794 A * 9/1991 Wischusen, III ...... B65D 5/248 229/179
D320,743 S 10/1991 Alexander
5,056,708 A 10/1991 Boyle et al.
5,058,803 A 10/1991 Gulliver
5,103,972 A 4/1992 Ackeret
RE33,979 E 6/1992 Cortopassi
5,154,343 A 10/1992 Stone
5,161,734 A 11/1992 Ruehl
5,205,478 A 4/1993 Wiscusen, III
D342,446 S 12/1993 Parker
D345,272 S 3/1994 Kelsoe
5,299,732 A 4/1994 Armor
D346,552 S 5/1994 Krupa
5,429,297 A 7/1995 Walsh
5,439,133 A 8/1995 Stone
5,450,998 A 9/1995 Esse
5,465,834 A 11/1995 Sieber et al.
5,503,268 A 4/1996 Pham
5,505,374 A 4/1996 Stone
5,511,722 A 4/1996 Dixon
5,515,996 A 5/1996 Stone
5,518,172 A 5/1996 Nanno
5,538,133 A 7/1996 Campbell
5,542,540 A 8/1996 Knapp

(56) References Cited

U.S. PATENT DOCUMENTS 5,551,938 A 9/1996 Stone
5,627,150 A 5/1997 Peterson
5,628,533 A 5/1997 Hill
D379,759 S 6/1997 Mulry
5,662,265 A 9/1997 Jensen
5,690,273 A 11/1997 Jensen
5,697,549 A 12/1997 Yocum
D389,739 S 1/1998 Auclair
5,725,144 A 3/1998 Stone et al.
5,772,030 A 6/1998 Baxter
5,810,250 A 9/1998 Stone et al.
5,826,781 A 10/1998 Jensen
5,875,962 A 3/1999 Jorgensen-Beck et al.
5,875,963 A 3/1999 Stone
D418,052 S 12/1999 Scrimger
6,027,018 A 2/2000 Yocum
6,041,997 A 3/2000 Jensen
6,047,829 A 4/2000 Johnstone
6,068,181 A 5/2000 Cai
6,105,774 A 8/2000 Jackson
6,105,855 A 8/2000 Kackstetter
6,138,904 A 10/2000 Baird
D437,222 S 2/2001 Goldberg
6,213,388 B1 4/2001 Ours et al.
6,230,893 B1 5/2001 Karow
6,296,175 B1 * 10/2001 Dixon .................... B65D 5/685
229/102
6,318,593 B1 11/2001 Laughlin et al.
D458,127 S 6/2002 Hendrik
D460,691 S 7/2002 Morris
6,412,636 B1 7/2002 Jones
6,484,931 B1 11/2002 Hofte
D467,499 S 12/2002 Garza
6,491,211 B1 12/2002 Evans
D472,463 S 4/2003 Kinigakis
D473,787 S 4/2003 Jones
6,575,299 B1 6/2003 Kinigakis
6,604,676 B2 8/2003 Giblin
6,641,031 B2 11/2003 Evans
D484,043 S 12/2003 Hwang
6,672,474 B2 1/2004 May
6,681,983 B2 1/2004 Bill-Moore
6,708,874 B1 3/2004 Montgomery
6,749,108 B2 6/2004 Naughton
6,752,272 B2 6/2004 Jones
D499,022 S 11/2004 Sun
6,945,449 B2 9/2005 Hengami
6,957,765 B2 10/2005 Howell
7,156,286 B2 1/2007 Hengami
7,353,969 B2 4/2008 McHutchinson
7,367,453 B2 5/2008 Sutherland
7,377,385 B2 5/2008 Giannini
7,389,875 B2 6/2008 Sandberg
7,473,215 B2 1/2009 Moen
7,503,475 B2 3/2009 McGowan
7,523,825 B2 4/2009 Velazquez
7,637,375 B2 12/2009 Sattel
7,658,318 B2 2/2010 Walsh
7,708,142 B2 5/2010 Ehrlund
7,726,552 B2 6/2010 Chadima
7,841,512 B2 11/2010 Westerman
7,854,325 B2 12/2010 Bentele
8,056,799 B2 11/2011 Burke
8,443,978 B2 5/2013 Royer
8,453,840 B2 6/2013 Wharton
8,740,050 B2 6/2014 Zinck
8,746,444 B2 6/2014 Dehlin
8,800,855 B2 8/2014 Fitzwater
8,997,979 B2 4/2015 Ghini
9,359,123 B2 6/2016 Bhattacharjee
9,475,605 B2 10/2016 Everett
9,783,335 B2 10/2017 Everett
D805,898 S 12/2017 Holley, Jr.
9,881,788 B2 1/2018 Kim
9,981,788 B2 5/2018 Skinner
10,017,291 B2 7/2018 Smith
10,053,259 B2 8/2018 Gungner
10,086,972 B2 10/2018 Hajek
10,124,944 B2 11/2018 Smalley
10,232,976 B2 3/2019 Waddington
10,301,091 B2 5/2019 Ramsuer
10,442,600 B2 10/2019 Waltermire
10,479,581 B2 11/2019 Chambers
10,486,849 B2 11/2019 Parkes
10,494,138 B1 12/2019 Velliquette
10,618,684 B2 4/2020 Eckert
10,661,940 B2 5/2020 Hajek
D899,245 S 10/2020 Mori
10,934,072 B2 3/2021 Lantz
D921,982 S 6/2021 Gerhards
11,046,476 B2 6/2021 Whitehurst
11,059,621 B2 7/2021 Nowak
11,365,022 B2 6/2022 Altman
11,794,947 B2 10/2023 Hoefte
11,932,468 B2 3/2024 Hoefte
11,993,434 B2 5/2024 Hoefte
12,012,262 B2 6/2024 Zirollo
12,116,184 B2 10/2024 Hoefte
12,134,503 B2 11/2024 Hoefte
12,162,651 B2 12/2024 Hoefte
12,473,118 B2 11/2025 Kavanagh
12,497,225 B2 12/2025 Thompson
12,570,434 B2 3/2026 Spahlinger
2002/0052302 A1 5/2002 Clark
2003/0047595 A1 3/2003 Bill-Moore
2003/0111523 A1 6/2003 Haugan
2003/0168502 A1 9/2003 Kisch
2003/0213722 A1 11/2003 Kinigakis
2003/0222130 A1 12/2003 Fukushima
2004/0065723 A1 4/2004 Hengami
2004/0074953 A1 4/2004 Yocum
2004/0099565 A1 5/2004 Dehlin
2005/0017061 A1 1/2005 Quaintance
2006/0118451 A1 6/2006 Edwards
2006/0283928 A1 12/2006 Walsh
2007/0221713 A1 9/2007 Wilson
2007/0267467 A1 11/2007 Burke
2008/0054059 A1 3/2008 Chadima
2008/0217204 A1 9/2008 Sattel
2008/0217205 A1 9/2008 Sattel
2008/0257773 A1 10/2008 Gelardi
2008/0265010 A1 10/2008 Montague Kisch
2009/0001145 A1 1/2009 Hasse
2009/0032575 A1 2/2009 D Amato
2009/0152134 A1 6/2009 Katsis
2009/0184022 A1 7/2009 Coe
2011/0168767 A1 7/2011 Hengami
2011/0204087 A1 8/2011 Kopulos
2013/0193197 A1 8/2013 Low
2013/0256391 A1 10/2013 Jolley
2013/0306718 A1 11/2013 Sumpmann
2013/0313311 A1 11/2013 Fath et al.
2014/0339293 A1 11/2014 McLeod
2014/0346220 A1 11/2014 Saulas
2015/0034711 A1 2/2015 Pinkstone
2015/0060537 A1 3/2015 Hajek et al.
2015/0083789 A1 3/2015 Fitzwater et al.
2015/0183548 A1 7/2015 Cho
2015/0197386 A1 7/2015 Chang
2015/0232785 A1 8/2015 Paullin
2015/0267155 A1 9/2015 Brooker
2016/0096650 A1 4/2016 Jamison
2016/0122445 A1 5/2016 Nambiar
2016/0152373 A1 6/2016 Linssen
2016/0251107 A1 9/2016 Everett
2016/0264286 A1 9/2016 Pinkstone
2017/0001751 A1 1/2017 Ishikawa
2017/0001752 A1 1/2017 Ishikawa
2017/0008664 A1 1/2017 Parkes
2017/0036808 A1 2/2017 Everett
2017/0062023 A1 3/2017 Datta
2017/0298308 A1 10/2017 Labeque
2017/0334600 A1 11/2017 Eckert
2018/0022498 A1 1/2018 Everett

(56) References Cited

U.S. PATENT DOCUMENTS

| | | | |
|---|---|---|---|
| 2018/0099775 | A1 | 4/2018 | Van Waarden |
| 2018/0215513 | A1 | 8/2018 | Perek |
| 2018/0257827 | A1 | 9/2018 | Drosos |
| 2018/0265816 | A1 | 9/2018 | Lintula |
| 2018/0346846 | A1 | 12/2018 | Kropf |
| 2019/0023448 | A1 | 1/2019 | Mehta |
| 2019/0062023 | A1 | 2/2019 | Lantz et al. |
| 2019/0084740 | A1 | 3/2019 | Davis et al. |
| 2019/0135503 | A1 | 5/2019 | De Wilde |
| 2019/0136153 | A1 | 5/2019 | Dicosimo |
| 2019/0202942 | A1 | 7/2019 | Lu |
| 2019/0291917 | A1 | 9/2019 | Curcic |
| 2019/0344925 | A1 | 11/2019 | Block |
| 2019/0390138 | A1 | 12/2019 | Sivik |
| 2020/0002646 | A1 | 1/2020 | Huang |
| 2020/0087020 | A1 | 3/2020 | Tsai et al. |
| 2020/0180808 | A1 | 6/2020 | Cauvin |
| 2020/0189813 | A1 | 6/2020 | Drosos |
| 2020/0331667 | A1 | 10/2020 | Bressan |
| 2020/0339303 | A1 | 10/2020 | Zeiler |
| 2021/0016939 | A1 | 1/2021 | Palmer |
| 2021/0047072 | A1 | 2/2021 | Ng Pak Leung |
| 2021/0053715 | A1 | 2/2021 | Tsai |
| 2021/0171235 | A1 | 6/2021 | Boland |
| 2021/0269191 | A1 | 9/2021 | Peterson et al. |
| 2021/0292056 | A1 | 9/2021 | Tidwell |
| 2021/0347524 | A1 | 11/2021 | Hoefte |
| 2022/0063877 | A1 | 3/2022 | Forenza |
| 2022/0081155 | A1 | 3/2022 | Hoefte |
| 2022/0144507 | A1 | 5/2022 | Ubell |
| 2022/0169426 | A1 | 6/2022 | Drosos |
| 2022/0185534 | A1 | 6/2022 | Hoefte |
| 2022/0204210 | A1 | 6/2022 | Joines |
| 2022/0250788 | A1 | 8/2022 | Bressan |
| 2022/0289425 | A1 | 9/2022 | Green |
| 2022/0289436 | A1 | 9/2022 | Hoefte |
| 2022/0306336 | A1 | 9/2022 | Bressan |
| 2022/0315297 | A1 | 10/2022 | Zirollo |
| 2022/0332460 | A1 | 10/2022 | Bressan |
| 2022/0380097 | A1 | 12/2022 | Li |
| 2023/0015201 | A1 | 1/2023 | Arango |
| 2023/0110630 | A1 | 4/2023 | Hoefte |
| 2023/0113321 | A1 | 4/2023 | Bressan |
| 2023/0132541 | A1 | 5/2023 | Hoefte |
| 2023/0142224 | A1 | 5/2023 | Buck |
| 2023/0249870 | A1 | 8/2023 | Huang |
| 2023/0264852 | A1 | 8/2023 | Hoefte |
| 2023/0264853 | A1 | 8/2023 | Hoefte |
| 2023/0286695 | A1 | 9/2023 | Hoefte |
| 2023/0322455 | A1 | 10/2023 | Beelen |
| 2023/0415950 | A1 | 12/2023 | Mack et al. |
| 2024/0010385 | A1 | 1/2024 | Spahlinger |
| 2024/0025607 | A1 | 1/2024 | Bressan |
| 2024/0158131 | A1 | 5/2024 | Waddington |
| 2024/0278968 | A1 | 8/2024 | Thompson |
| 2024/0327063 | A1 | 10/2024 | Bressan |
| 2025/0100763 | A1 | 3/2025 | Spahlinger |
| 2025/0145327 | A1 | 5/2025 | Oliveira |

FOREIGN PATENT DOCUMENTS

| | | | | |
|---|---|---|---|---|
| CH | 534616 | | 3/1973 | |
| CH | 681293 | | 2/1993 | |
| CH | 710519 | A2 | 6/2016 | |
| CN | 105209590 | | 12/2015 | |
| CN | 109071064 | | 12/2018 | |
| CN | 110817035 | A | 2/2020 | |
| CN | 112498895 | A | 3/2021 | |
| DE | 9214914 | U1 | 1/1993 | |
| DE | 202020106481 | | 2/2022 | |
| DE | 102020129814 | | 5/2022 | |
| EM | 15091757 | | 2/2025 | |
| EP | 0571711 | A2 | 12/1993 | |
| EP | 0679581 | | 11/1995 | |
| EP | 1783058 | A1 | 5/2007 | |
| EP | 1783058 | | 4/2010 | |
| EP | 2594507 | A1 | 5/2013 | |
| EP | 2512938 | B1 | 6/2017 | |
| EP | 3261941 | | 1/2018 | |
| EP | 3587293 | A1 | 1/2020 | |
| EP | 3623308 | A1 | 3/2020 | |
| EP | 3753856 | A1 | 12/2020 | |
| EP | 3 871 989 | | 9/2021 | |
| EP | 3871989 | A1 | 9/2021 | |
| EP | 3978380 | | 4/2022 | |
| EP | 4 039 606 | | 8/2022 | |
| EP | 4039606 | A1 | 8/2022 | |
| EP | 4163219 | | 4/2023 | |
| EP | 4245676 | | 9/2023 | |
| EP | 4269264 | | 11/2023 | |
| FR | 2820718 | A1 | 8/2002 | |
| GB | 385033 | | 12/1932 | |
| GB | 2256425 | A | 12/1992 | |
| GB | 2358391 | | 7/2001 | |
| JP | 52022499 | Y2 | 5/1977 | |
| JP | S5222499 | | 5/1977 | |
| JP | S54142223 | | 10/1979 | |
| JP | H03639 | | 1/1991 | |
| JP | H11049151 | A | 2/1999 | |
| JP | 2002029536 | A | 1/2002 | |
| JP | 2002145256 | A | 5/2002 | |
| JP | 2009161222 | A | 7/2009 | |
| JP | 4536881 | B2 | 9/2010 | |
| JP | 2011140318 | A | 7/2011 | |
| JP | 2011173640 | A | 9/2011 | |
| JP | 2011189978 | A | 9/2011 | |
| JP | 2013531589 | | 8/2013 | |
| JP | 2017007691 | A | 1/2017 | |
| JP | 2017131364 | | 8/2017 | |
| JP | 2017171364 | A | 9/2017 | |
| JP | 2018009176 | | 1/2018 | |
| JP | 6298245 | B2 | 3/2018 | |
| JP | 2018076095 | A | 5/2018 | |
| JP | 3216684 | | 6/2018 | |
| KR | 200310542 | Y1 | 4/2003 | |
| KR | 100906301 | B1 | 7/2009 | |
| NL | 100017 | | 12/1961 | |
| TW | 201444743 | A | 12/2014 | |
| WO | 03101840 | A1 | 12/2003 | |
| WO | 2008038189 | | 4/2008 | |
| WO | 2008054305 | A1 | 5/2008 | |
| WO | 2010015638 | | 2/2010 | |
| WO | 2010085471 | | 7/2010 | |
| WO | 2011012863 | A1 | 2/2011 | |
| WO | 2011154822 | | 12/2011 | |
| WO | 2013076012 | A1 | 5/2013 | |
| WO | 2018022493 | A1 | 2/2018 | |
| WO | 2019094406 | A1 | 5/2019 | |
| WO | 2019236830 | A1 | 12/2019 | |
| WO | 2020052911 | A1 | 3/2020 | |
| WO | 2021013515 | | 1/2021 | |
| WO | 2021044266 | A1 | 3/2021 | |
| WO | WO-2022101339 | A1 * | 5/2022 | ............... B65D 5/38 |
| WO | 2023150283 | A1 | 8/2023 | |
| WO | 2024049779 | A1 | 3/2024 | |

OTHER PUBLICATIONS

Extended European Search Report issued in App No. EP23750213 dated Nov. 11, 2025, 15 pages.

12 × 12 × Kraft Tab Locking Literature Mailers S-16934—Uline. Date first available: Dec. 1, 2020. Site visited: Mar. 4, 2025. Available online: https://www.uline.com/Product/Detail/S-16934/1ndestructo-and-Literatu re-Mailers/12-x-12-x-6- Kraft-Tab-Locking-Literature-Mailers, Year: 2020, (pp. 1-1).

Custom Corrugated Boxes | Flip Top Storage Box | CustomBoxline. Date first available: Sep. 22, 2021. Site visited: Mar. 4, 2025. Available online: https://www.customboxline.com/producUcustom-corrugated-boxes-flip-top-storage-box, Year: 2021, (pp. 1-6).

Strength Packaging | Graphic Packaging International. Date first available: Mar. 31, 2024. Site visited: Mar. 4, 2025. Available online: https://www.graphicpkg.com/solutions/packaging-solutions/strength-packaging/, Year: 2024, (pp. 1-10).

(56) References Cited

OTHER PUBLICATIONS

International Search Report and Written Opinion for PCT/US2023/031 328 dated Dec. 13, 2023, 11 pages.
GRAPHICPACKAGING_Wrap-Style Multipack Cartons, Date Not Available, [online], [site visited Feb. 5, 2026]. Available from internet, URL: htp://www.graphicpg.com/wrap-style-multiack-cartons-forfood-and-beverage-applications/ (Year 2026).
International Search Report and Written Opinion for PCT/US2023/026994 dated Oct. 26, 2023, 11 pages.
Office Action (Non-Final Rejection) dated Feb. 27, 2026 for U.S. Appl. No. 18/941,443 (pp. 1-17).
Office Action (Non-Final Rejection) dated Mar. 9, 2026 for U.S. Appl. No. 18/036,248 (pp. 1-6).
Office Action (Non-Final Rejection) dated Mar. 25, 2026 for U.S. Appl. No. 18/728,966 (pp. 1-32).
Office Action (Non-Final Rejection) dated Dec. 23, 2025 for U.S. Appl. No. 18/509,612 (pp. 1-21).
Office Action dated Feb. 19, 2026 for U.S. Appl. No. 29/957,943 (pp. 1-6).

* cited by examiner

CARTON WITH LOCKING FEATURES

CROSS-REFERENCE TO RELATED APPLICATIONS

This application claims the benefit of German Utility Model Application No. 202022103909.7, filed on Jul. 12, 2022.

INCORPORATION BY REFERENCE

The disclosure of German Utility Model Application No. 202022103909.7, which was filed on Jul. 12, 2022, is incorporated by reference for all purposes as if presented herein in its entirety.

BACKGROUND OF THE DISCLOSURE

The present disclosure generally relates to cartons/boxes for holding one or more products. More specifically, the present disclosure relates to a carton with an inner construct at least partially received within an outer construct and with locking features for selectively limiting and/or resisting relative movement between the constructs of the carton.

Cartons/boxes with locking features can be used for a wide variety of different products, such as dishwashing agents, medicines, household cleaners, candles, cosmetics, tobacco, and other products that should be kept out of the hands of children, as they may put the products in their mouths, swallow them, or use them in other dangerous ways. In examples, one may want to keep certain products out of the reach of infants, toddlers, kindergarten children, and children of preschool age, i.e., up to about the age of six, for example.

SUMMARY OF THE DISCLOSURE

In general, one aspect of the disclosure is directed to a carton, comprising an inner construct that can comprise a plurality of inner panels extending at least partially around a first interior of the inner construct. The inner construct can comprise at least a first inner locking tab and a second inner locking tab. An outer construct can comprise a plurality of outer panels extending at least partially around a second interior of the outer construct. The inner construct can be at least partially received in the second interior of the outer construct. The outer construct can comprise at least a first outer locking tab and a second outer locking tab. The second inner locking tab and the second outer locking tab can cooperate to limit movement between the inner construct and the outer construct in a closed configuration of the carton, and, when the second inner locking tab has been disengaged from the second outer locking tab, one or both of the inner construct and the outer construct can be movable from the closed configuration of the carton to an intermediate configuration in which the first inner locking tab and the first outer locking tab cooperate to limit movement between the inner construct and the outer construct.

In another aspect, the disclosure is generally directed to, in combination, a first blank and a second blank for cooperating to at least partially form a carton. The first blank can comprise a plurality of inner panels, a first inner locking tab, and a second inner locking tab, and the first blank can be for forming an inner construct. The second blank can comprise a plurality of outer panels, a first outer locking tab, and a second outer locking tab. The second blank can be for forming an outer construct for at least partially receiving the inner construct formed from the first blank when the carton is formed from the first blank and the second blank. The second inner locking tab and the second outer locking tab can be configured for selectively cooperating to limit movement between the inner construct formed from the first blank and the outer construct formed from the second blank when the carton formed from the first blank and the second blank is in a closed configuration, and wherein the first inner locking tab and the first outer locking tab can be configured for selectively cooperating to limit movement between the inner construct formed from the first blank and the outer construct formed from the second blank when the carton formed from the first blank and the second blank is in an intermediate configuration.

In another aspect, the disclosure is generally directed to a method of forming a carton. The method can include obtaining a first blank comprising a plurality of inner panels, a first inner locking tab, and a second inner locking tab, forming an inner construct from the first blank by folding the plurality of inner panels at least partially around a first interior of the inner construct, obtaining a second blank comprising a plurality of outer panels, a first outer locking tab, and a second outer locking tab, and forming an outer construct from the second blank by folding the plurality of outer panels at least partially around a second interior of the outer construct. The method further can comprise moving at least one of the inner construct and the outer construct relative to the other to assemble the carton with the inner construct at least partially received in the second interior of the outer construct. The second inner locking tab and the second outer locking tab can cooperate to limit movement between the inner construct and the outer construct in a closed configuration of the carton, and, when the second inner locking tab has been disengaged from the second outer locking tab, one or both of the inner construct and the outer construct can be movable from the closed configuration of the carton to an intermediate configuration in which the first inner locking tab and the first outer locking tab cooperate to limit movement between the inner construct and the outer construct.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

Detailed Description of the Exemplary Embodiments

The present disclosure generally relates to constructs, boxes, cartons, carriers, trays, or the like, and packages for holding one or more products or articles such as those that should be kept out of the hands of children (e.g., for safety reasons). The product or products can be cleaning products such as dishwashing agents, household cleaners, soaps, and the like; medicines; cosmetics; candles; tobacco; objects that may pose a choking hazard; any other suitable product or material; or combinations thereof.

Constructs according to the present disclosure can accommodate product or articles of any shape. In this specification, the terms “inner,” “interior,” “outer,” “exterior,” “lower,” “bottom,” “upper,” and “top” indicate orientations determined in relation to fully erected and upright constructs and cartons. As described herein, constructs can be formed from blanks by being glued with multiple panels, portions, tabs, and/or flaps, which may be designated herein in terms relative to one another, e.g., “first”, “second”, “third”, etc., in sequential or nonsequential reference, without departing from the disclosure.

Figure 1:
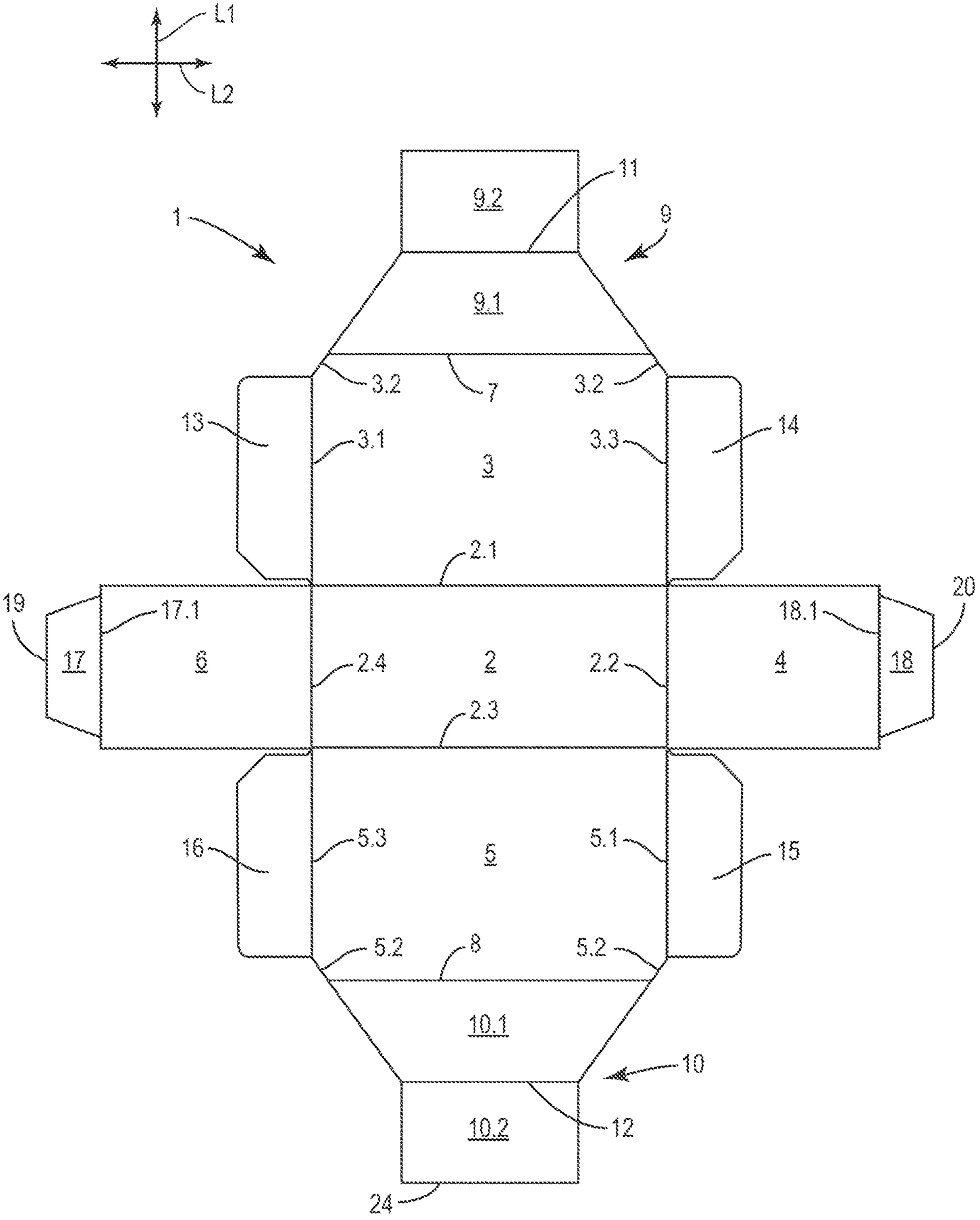
FIG. 1 is a plan view of a first blank for forming an inner construct according to exemplary embodiments of the disclosure.
Figure 3:
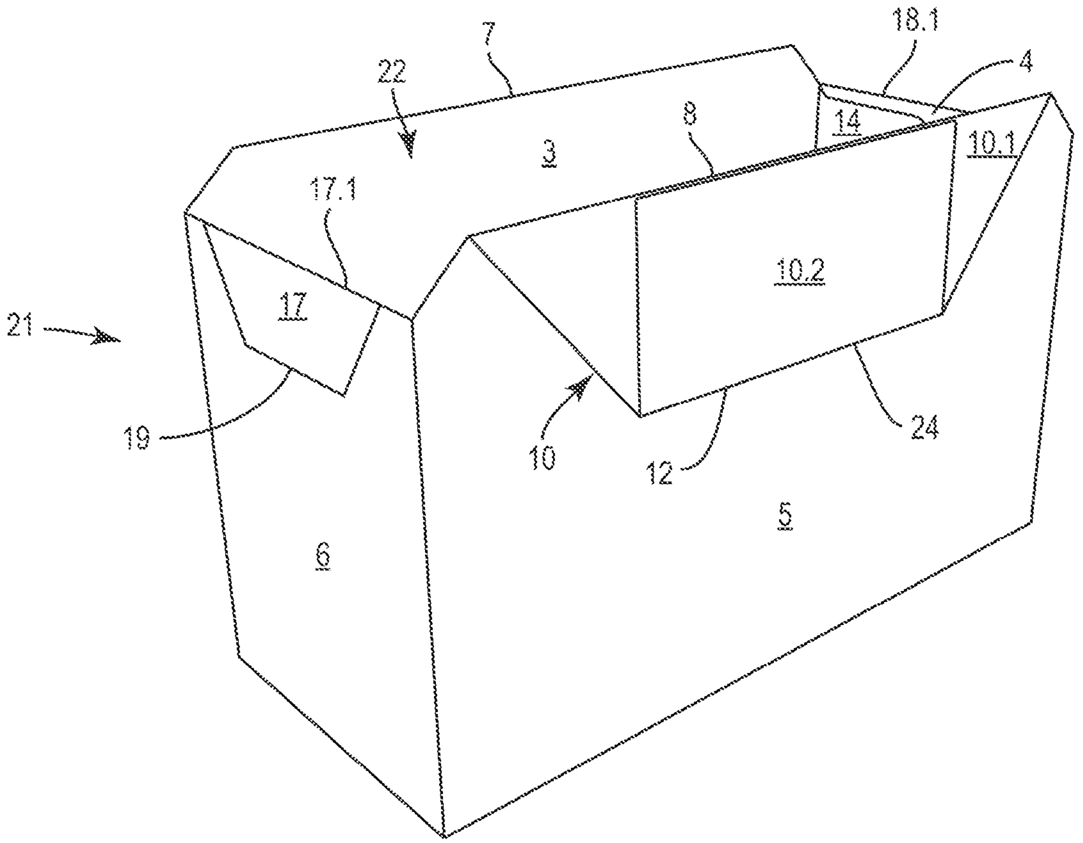
FIG. 3 is a perspective view of the inner construct formed from the first blank of FIG. 1 and the folded first blank of FIG. 2 according to exemplary embodiments of the disclosure.
Figure 4:
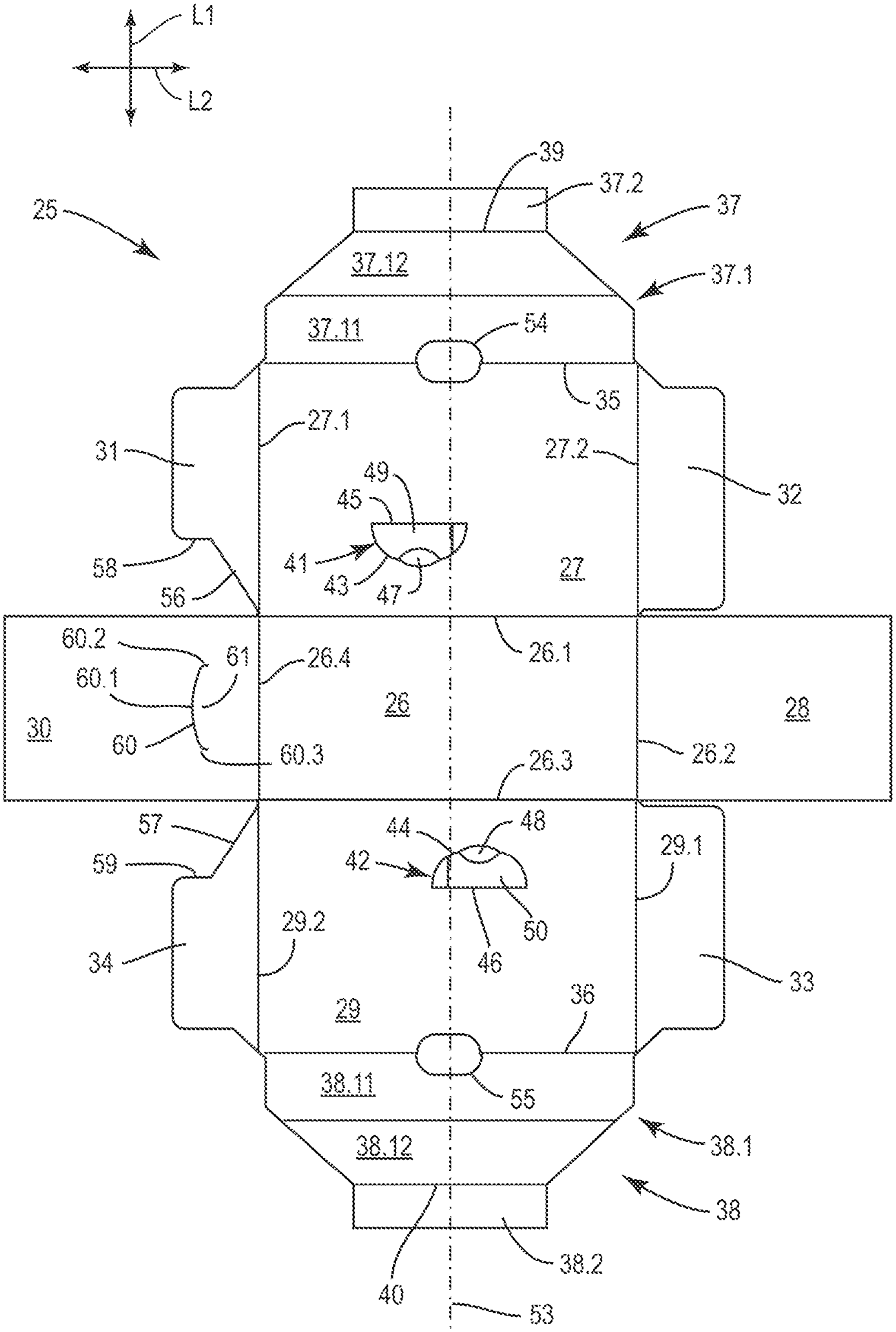
FIG. 4 is a plan view of a second blank for forming an outer construct according to exemplary embodiments of the disclosure.

According to FIG. 1, a first blank 1 is used to form an inner part or inner construct 21 (FIGS. 3 and 7-9) with a first opening 22 according to exemplary embodiments of the disclosure. The inner construct 21 can be a container used to hold one or more products (not shown). FIG. 4 illustrates a second blank 25 used to form an outer part or outer construct 65 (e.g., a cover 65) (FIGS. 6-9) with a second opening 66 according to exemplary embodiments of the disclosure. In embodiments, the inner (interior) construct 21 and the outer (exterior) construct 65 cooperate to form a carton 69 (FIGS. 8 and 9) with the outer construct 65 extending at least partially around the inner construct 21 and the inner construct 21 being selectively movable within the outer construct 65 between a closed configuration (FIG. 8), an intermediate, partially unlocked configuration (FIG. 9), and an open configuration (FIG. 7), as described in more detail below. In the illustrated embodiments, the inner construct 21 and the outer construct 65 can include locking and stop features for cooperating to resist and/or limit movement of the inner construct 21 and the outer construct 49 relative to one another, as described in more detail below. In exemplary embodiments, the blanks 1, 25 can be made of paperboard, cardboard, corrugated cardboard, or other suitable material.

As shown in FIG. 1, the first blank 1 has a longitudinal direction L1 and a lateral direction L2. In the illustrated embodiment, the first blank 1 can have a bottom wall or panel 2 that is foldably connected at its edges to four first side walls or inner panels 3, 4, 5, 6 along respective fold lines 2.1, 2.2, 2.3, 2.4. For example, the bottom panel 2 can be foldably connected to the respective first inner side panel 3 and second inner side panel 5 along respective lateral fold lines 2.1, 2.3, and the bottom panel 2 can be foldably connected to the respective first inner end panel 4 and second inner end panel 6 along respective longitudinal fold lines 2.2, 2.4. As shown in FIG. 1, at least the bottom panel 2 and the inner end panels 4, 6 can be rectangular. Any of the bottom panel 2 and/or the inner panels 3, 4, 5, 6 could be omitted or could be otherwise shaped, arranged, and/or configured without departing from the disclosure.

In the illustrated embodiments, the inner side panels 3, 5 can be foldably connected to respective inner locking tabs 9, 10 (e.g., first inner locking tabs) along respective lateral fold lines 7, 8 at opposing edges of the inner side panels 3, 5. As shown in FIG. 1, each of the inner locking tabs 9, 10 can include a respective proximal section 9.1, 10.1 (e.g., an inner or first proximal section) and a respective distal section 9.2, 10.2 (e.g., an inner or first distal section). In embodiments, the proximal sections 9.1, 10.1 are foldably connected (e.g., directly foldably connected) to the respective inner side panels 3, 5 along the respective lateral fold lines 7, 8 and are foldably connected to the respective distal sections 9.2, 10.2 along respective lateral fold lines 11, 12. In the illustrated embodiments, the proximal sections 9.1, 10.1 can be trapezoidal (e.g., so that the fold lines 11, 12 are shorter than the fold lines 7, 8 and the free edges of the proximal sections 9.1, 10.1 are oblique) and the distal sections 9.2, 10.2 can be rectangular. Alternatively, the sections 9.1, 9.2, 10.1, 10.2 could have any suitable shape.

As shown in FIG. 1, the first inner side panel 3 is foldably connected to respective inner dust flaps or inner side end flaps 13, 14 along respective longitudinal fold lines 3.1, 3.3. Similarly, the second inner side panel 5 is foldably connected to respective inner dust flaps or inner side end flaps 15, 16 along respective longitudinal fold lines 5.1, 5.3. In embodiments, the longitudinal fold lines 3.1, 3.3 and 5.1, 5.3 can extend along rectangular sections of the respective inner side panels 3, 5. Further, oblique free edges 3.2, 5.2 of the respective inner side panels 3, 5 can extend from the respective longitudinal fold lines 3.1, 3.3 and 5.1, 5.3 to respective ends of the respective lateral fold lines 7, 8 to at least partially define respective trapezoidal sections of the respective inner side panels 3, 5. In the illustrated embodiments, each of the free edges of the proximal sections 9.1, 10.1 of the inner locking tabs 9, 10 can extend as a continuation of the respective oblique free edges 3.2, 5.2 of the inner side panels 3, 5. Any of the first inner locking tabs 9, 10, the inner side end flaps 13, 14, 15, 16, and/or the inner side panels 3, 5 could be omitted or could be otherwise shaped, arranged, and/or configured without departing from the disclosure.

In the illustrated embodiments, the inner end panels 4, 6 are foldably connected to respective locking tabs 18, 17 (e.g., second inner locking tabs) along respective longitudinal fold lines 18.1, 17.1 at opposing upper edges of the inner end panels 4, 6. As shown in FIG. 1, each of the second inner locking tabs 17, 18 can include a respective inner locking edge 19, (e.g., second inner locking edge) at its outer edge. In embodiments, the second inner locking tabs 17, 18 are trapezoidal wherein the inner locking edges 19, 20 are narrower than the fold lines 17.1, 18.1. Alternatively, the second inner locking tabs 17, 18 could have any suitable shape. The first blank 1 could be otherwise shaped, arranged, and/or configured without departing from the disclosure.

Figure 2:
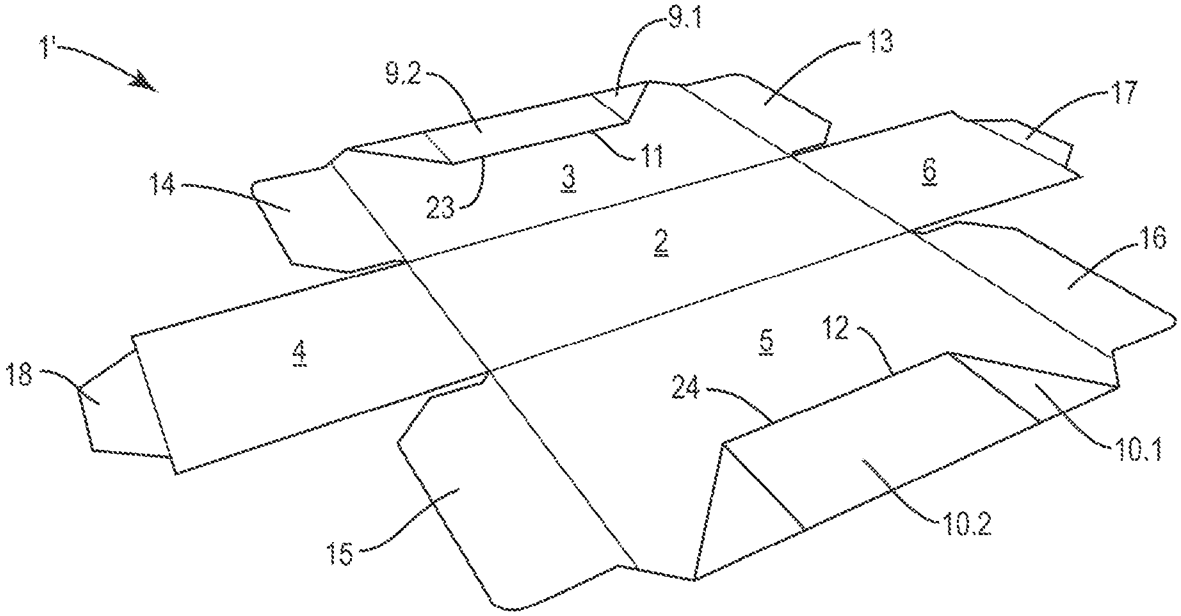
FIG. 2 is a perspective view of a folded first blank formed from the first blank of FIG. 1 according to exemplary embodiments of the disclosure.

In a first processing step for forming the inner construct 21 (FIGS. 3 and 7-9) from the first blank 1, as shown in FIG. 2, the proximal sections 9.1, 10.1 of the first inner locking tabs 9, 10 can be folded along the respective lateral fold lines 7, 8 over the respective inner side panels 3, 5 and can be secured (e.g., adhesively bonded) to the respective inner side panels 3, (e.g., the proximal sections 9.1, 10.1 and the inner side panels 3, 5 can be in an overlapping relationship and/or in face-to-face contact). Further, the distal sections 9.2, 10.2 of the first inner locking tabs 9, 10 can be folded against and secured (e.g., adhesively bonded) to the respective proximal sections 9.1, 10.1 of the first inner locking tabs 9, 10. Alternatively, the distal sections 9.2, 10.2 can be secured between the respective proximal sections 9.1, 10.1 and the respective inner side panels 3, 5. As shown in FIGS. 2, 3, and 7-9, the folded inner locking tabs 9, 10 form first inner locking edges 19, 20 along the respective lateral fold lines 11, 12. In exemplary embodiments, the locking tabs 9, 10 can be folded and glued to the respective inner side panels 3, 5 (e.g., by a manufacturer of the packaging) and then stored and/or transported (e.g., to a packer) in a flat, glued blank 1' configuration (FIG. 2), such as in stacks with other similar or identical blanks 1'.

As shown in FIGS. 3 and 7-9, the erected inner construct 21 can be formed from the flat, glued blank 1' (e.g., by a folder-gluer system, a packer, etc.) by folding the inner side panels 3, 5 along the lateral fold lines 2.1, 2.3 to extend upwardly from the bottom panel 2, folding the inner end flaps 13, 16 and 14, 15 along the respective longitudinal fold lines 3.1, 5.3 and 3.3, 5.1 over the respective ends of the inner construct 21, and folding the inner end panels 6, 4 along the respective longitudinal fold lines 2.4, 2.2 over the respective ends of the inner construct 21. In the illustrated embodiments, the inner side end flaps 13, 14, 15, 16 can be folded to extend between the inner side panels 3, 5, perpendicular to the inner side panels 3, 5. In embodiments, the first inner end panel 4 can overlap and can be secured (e.g., adhered) to the inner side end flaps 14, 15 to form a first inner end wall, and the second inner end panel 6 can overlap and can be secured (e.g., adhered) to the inner side end flaps 13, 16 to form a second inner end wall. As shown in FIGS. 3 and 7-9, the bottom panel 2, the inner panels 3, 4, 5, 6, and the inner end flaps 13, 14, 15, 16 can extend at least partially around a first interior of the inner construct 21 for receiving items in the inner construct 21. In the illustrated embodiments, erected inner construct 21 can have a first or inner opening 22 defined between the inner panels 3, 4, 5, 6 in relation to the bottom panel 2 (e.g., for inserting products into and removing products from the inner construct 21). In the illustrated embodiments, the first inner locking edges 23, 24 can face away from the inner opening 22 and toward the bottom panel 2 and can be spaced apart from the inner opening 22 and the bottom panel 2.

Figure 7:
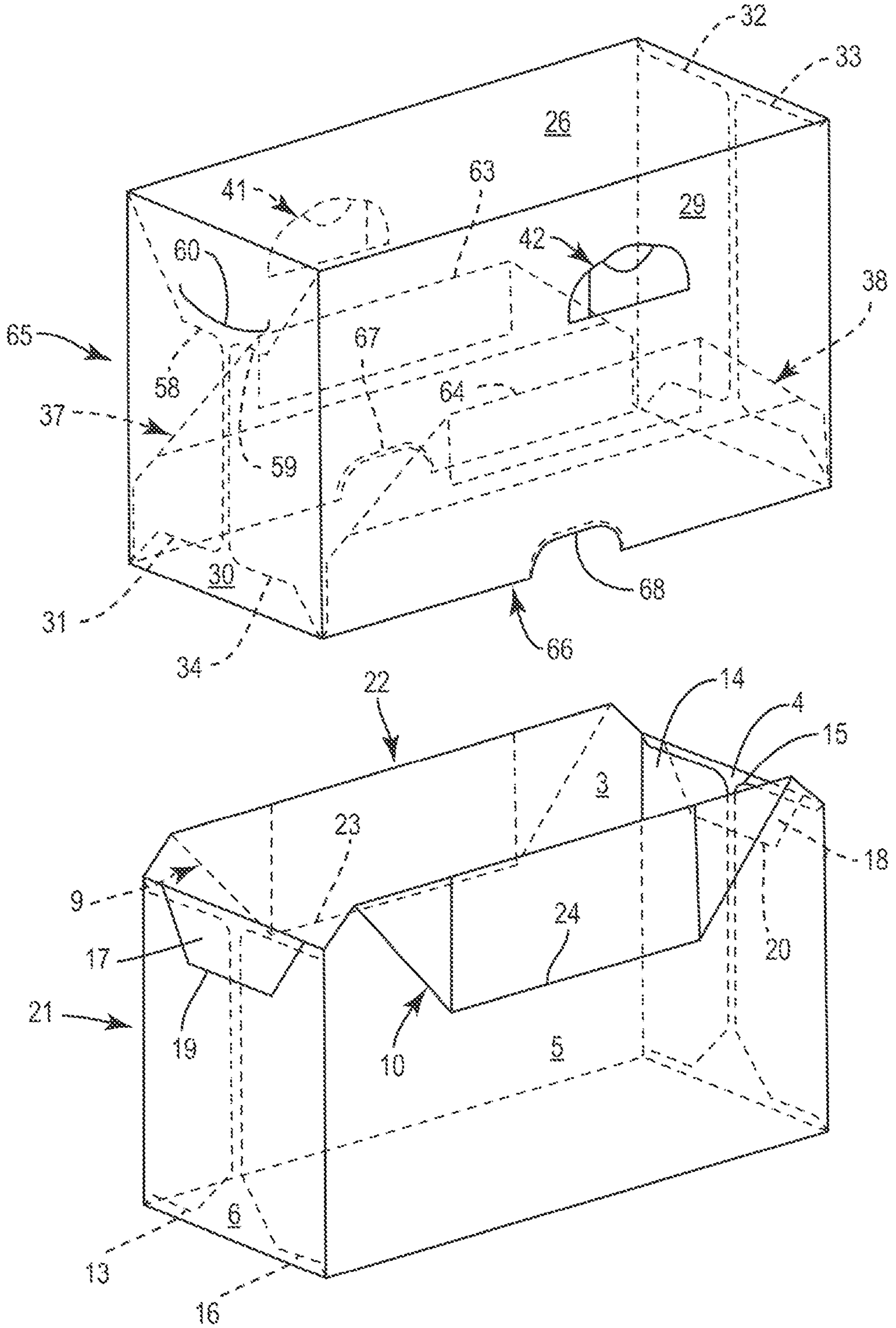
FIG. 7 is a perspective view of the inner construct of FIG. 3 and the outer construct of FIG. 6 arranged relative to one another for moving the outer construct onto the inner construct and/or after removing the inner construct from the outer construct, wherein hidden features of the inner construct and the outer construct are shown in broken lines, according to exemplary embodiments of the disclosure.

In the illustrated embodiments, the second inner locking tabs 17, 18 can be folded outwardly and downwardly along the respective longitudinal fold lines 17.1, 18.1 so that the second inner locking edges 19, 20 point downwardly (e.g., toward the bottom panel 2). As shown in FIGS. 3 and 7, the second inner locking tabs 17, 18 can be folded into an overlapping relationship and/or in face-to-face contact with the respective inner end panels 6, 4. In embodiments, one or both of the second inner locking tabs 17, 18 could be free to pivot with respect to the inner end panels 6, 4 or could be secured (e.g., adhered) to the inner end panels 6, 4. In exemplary embodiments, the second inner locking tabs 17, 18 could be folded prior to forming the inner construct 21 (e.g. in the folded and glued blank 1'). The inner construct 21 could be otherwise formed without departing from the disclosure.

As shown in FIG. 4, the second blank 25 for the outer part/construct 65 can have a longitudinal direction L1 and a lateral direction L2. In the illustrated embodiment, the second blank 25 can include a top wall or panel 26 that is foldably connected at its edges to four second side walls or outer panels 27, 28, 29, 30 along respective fold lines 26.1, 26.2, 26.3, 26.4. For example, the top panel 26 can be foldably connected to the respective first outer side panel 27 and second outer side panel 29 along respective lateral fold lines 26.1, 26.3, and the top panel 26 can be foldably connected to the respective first outer end panel 28 and second outer end panel 30 along respective longitudinal fold lines 26.2, 26.4. In embodiments, each of the top wall 26 and the outer panels 27, 28, 29, 30 can be rectangular. Any of the top panel 26 and/or the outer panels 27, 28, 29, 30 could be omitted or could be otherwise shaped, arranged, and/or configured without departing from the disclosure.

In the illustrated embodiments, the first outer side panel 27 can be foldably connected to respective outer dust flaps or outer side end flaps 31, 32 along respective longitudinal fold lines 27.1, 27.2. Similarly, the second outer side panel 29 can be foldably connected to respective outer dust flaps or outer side end flaps 33, 34 along respective longitudinal fold lines 29.1, 29.2. Any of the outer side end flaps 31, 32, 33, 34 and/or the outer side panels 27, 29 could be omitted or could be otherwise shaped, arranged, and/or configured without departing from the disclosure.

As shown in FIG. 4, the outer side panels 27, 29 can be foldably connected to respective outer locking tabs 37, 38 (e.g., first outer locking tabs) along respective lateral fold lines 35, 36 at opposing edges of the outer side panels 27, 29. In the illustrated embodiments, each of the outer locking tabs 37, 38 can include a respective proximal section 37.1, 38.1 (e.g., an outer proximal section) and a respective distal section 37.2, 38.2 (e.g., an outer distal section). In embodiments, the proximal sections 37.1, 38.1 are foldably connected (e.g., directly foldably connected) to the respective outer side panels 27, 29 along the respective lateral fold lines 35, 36 and are foldably connected to the respective distal sections 37.2, 38.2 along respective lateral fold lines 39, 40, which are opposite to the respective lateral fold lines 35, 36. In exemplary embodiments, each of the proximal sections 37.1, 38.1 can have two portions, wherein the first portions 37.11, 38.11 adjoin the respective lateral fold lines 35, 36 and can be rectangular (e.g., can be defined by free edges extending in the longitudinal direction L1). In embodiments, the second portions 37.12, 38.12 adjoin the respective lateral fold lines 39, 40 and are trapezoidal (e.g., can be defined by free edges that are oblique), wherein the respective second portions 37.12, 38.12 widen toward the respective first portions 37.11, 38.11. In exemplary embodiments, the distal sections 37.2, 38.2 can be rectangular and can be foldably connected to the short edges of the proximal sections 37.1, 38.1 along the lateral fold lines 39, 40. Alternatively, the sections 37.1, 37.2, 38.1, 38.2 could have any suitable shape.

Figure 9:
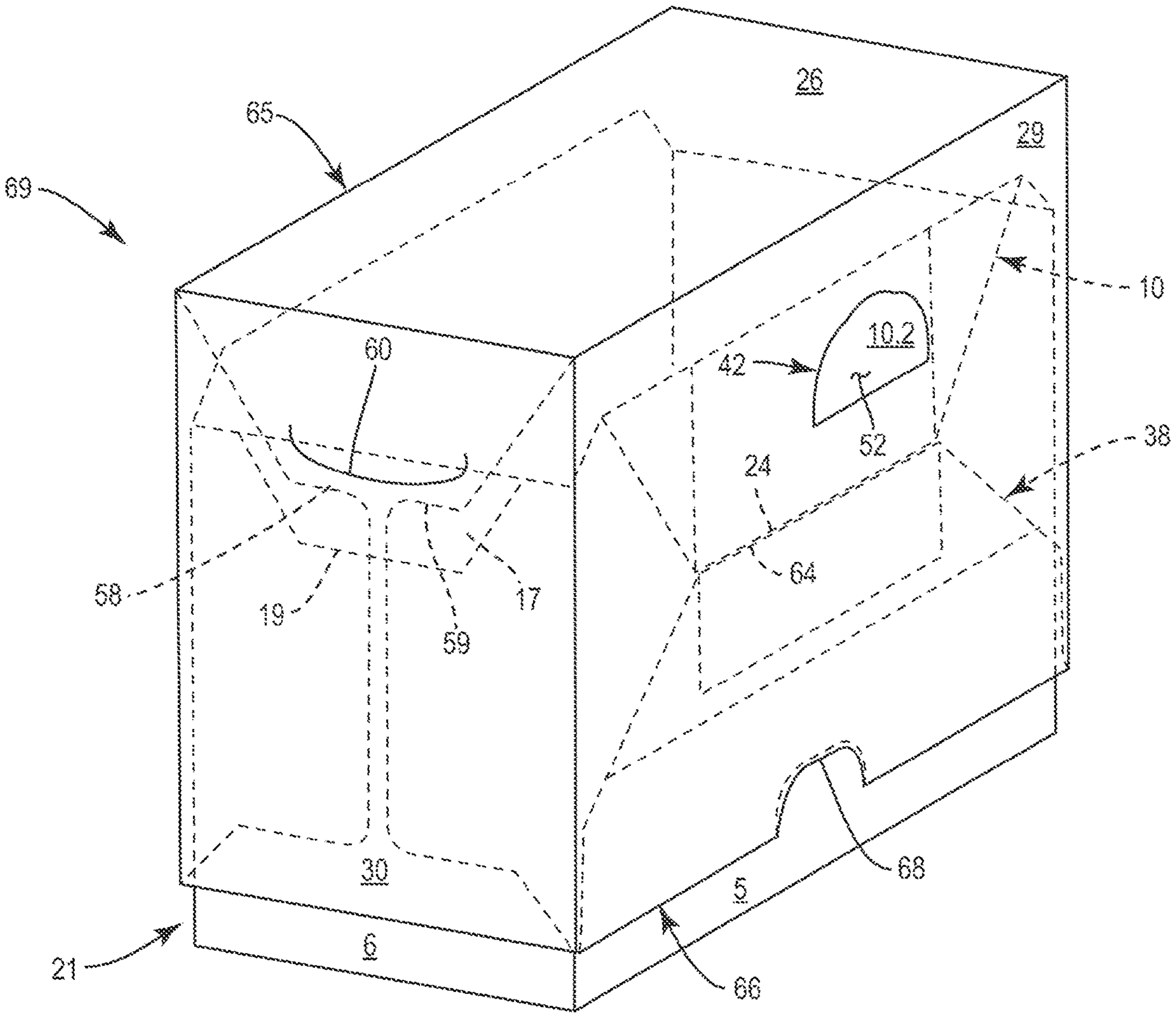
FIG. 9 is a perspective view of the carton of FIG. 8 in a partially unlocked/opened configuration according to exemplary embodiments of the disclosure.

In the illustrated embodiments, the second blank 25 can include engagement devices or features 41, 42 (e.g., first engagement devices) extending in the respective outer side panels 27, 29. As shown in FIG. 4, the engagement devices 41, 42 can be positioned closer to the top panel 26 than to the respective outer locking tabs 37, 38. In embodiments, the engagement devices 41, 42 can include respective weakening lines 43, 44 (e.g., cut or tear lines) and lateral fold lines 45, 46 that at least partially define respective engagement covers or cover panels 49, 50. The weakening lines 43, 44 can extend from the ends of the respective lateral fold lines 45, 46. In other embodiments, the fold lines 45, 46 could be replaced by tear or cut lines or could be continuations of the respective weakening lines 43, 44. In exemplary embodiments, the weakening lines 43, 44 can be formed by mutually offset scribe lines in the outer surfaces and inner surfaces of the outer side panels 27, 29, and, in embodiments, the scribe lines in the outer surfaces of the outer side panels 27, 29 can be offset outwardly with respect to the scribe lines on the inner surfaces. As shown in FIG. 4, the engagement devices 41, 42 can include respective access openings 47, 48 (e.g., lenticular openings) extending along an edge of the respective weakening lines 43, 44 (e.g., proximate to the top panel 26). Alternatively, the access openings 47, 48 could be positioned along any portion of the respective cover panels 49, 50 or could be omitted. As shown in FIG. 4, the engagement devices 41, 42 can be offset from the center axis 53 (e.g., the longitudinal centerline) of the second blank 25 in opposite directions. For example, the engagement device 41 can be offset from the center axis 53 in the lateral direction L2 toward the outer side end flap 31 (e.g., to the right in the view of FIG. 4), and the engagement device 42 can be offset from the center axis 53 in the lateral direction L2 toward the outer side end flap 33 (e.g., to the right in the view of FIG. 4). In embodiments, the covers 49, 50 can be removed such as by grasping the cover 49, 50 at the respective access opening 47, 48 and tearing along the weakening lines 43, 44 to form respective engagement holes 52 (FIG. 9) in the respective outer side panels 23, 25. As the covers 49, 50 are torn along the weakening lines 43, 44, they can be folded downwardly and outwardly along the respective lateral fold lines 45, 46. The engagement hole 52 for the engagement device 42 is shown in FIG. 9, wherein the cover panel has been completely removed (e.g., torn away along the fold line 46 as well as the weakening line 44).

As shown in FIG. 4, the second blank 25 further can include engagement openings 54, 55 (e.g., in the shape of an oval). In embodiments, the opening 54 can extend in the first outer side panel 27 and the proximal portion 37.1 of the first outer locking tab 37 (e.g., with half in the outer side panel 27 and half in the proximal portion 37.1 arranged symmetrically with respect to the lateral fold line 35). Further, the engagement opening 55 extending in the second outer side panel 29 and the proximal portion 38.1 of the second outer locking tab 38 (e.g., with half in the outer side panel 29 and half in the proximal portion 38.1 arranged symmetrically with respect to the lateral fold line 36). In the illustrated embodiments, the engagement openings 54, 55 can be arranged on the center axis 53. Any of the engagement features 41, 42, 54, 55 could be omitted or could be otherwise shaped, arranged, and/or configured without departing from the disclosure. For example, the engagement features could have any suitable shape. In another example, the covers 49, 50 could be omitted so that the engagement features 41, 42 are openings in the outer side panels 27, 29. Further, at least partially removable panels (not shown) (e.g., similar to the cover panels 49, 50) can be included in the second blank 25 and can be removed by tearing along weakening lines (not shown) (e.g., similar to the weakening lines 45, 46) to form the engagement openings 54, 55.

In the illustrated embodiments, each of the outer side end flaps 31, 34 can include a respective bevel 56, 57 and a respective second outer locking edge 58, 59 extending from the respective bevel 56, 57 along the upper edges of the outer side end flaps 31, 34 (e.g., proximate to the outer end flap 30 and the top panel 26). As shown in FIG. 4, the bevels 56, 57 can be oblique and the second outer locking edges 58, 59 can extend in the lateral direction L2 (e.g., parallel to the fold lines 39, 40). In embodiments, the outer side end flaps 31, 34 can be considered second outer locking tabs having the second outer locking edges 58, 59. Also as shown in FIG. 4, the outer end panel 30 extending between the second outer locking edges 58, 59 can include a slot 60 with a central slot portion 60.1 extending substantially in the longitudinal direction L1 and two end slot portions 60.2, 60.3 extending substantially in the lateral direction L2 from the respective ends of the central slot portion 60.1. In embodiments, the slot 60, including its central slot portion 60.1 and end slot portions 60.3, can at least partially define a bending region or tab 61. Any of the bevels 56, 57, the second outer locking edges 58, 59, the slot 60, and/or the bending tab 61 could be omitted or could be otherwise shaped, arranged, and/or configured without departing from the disclosure. The second blank 25 could be otherwise shaped, arranged, and/or configured without departing from the disclosure.

Figure 5:
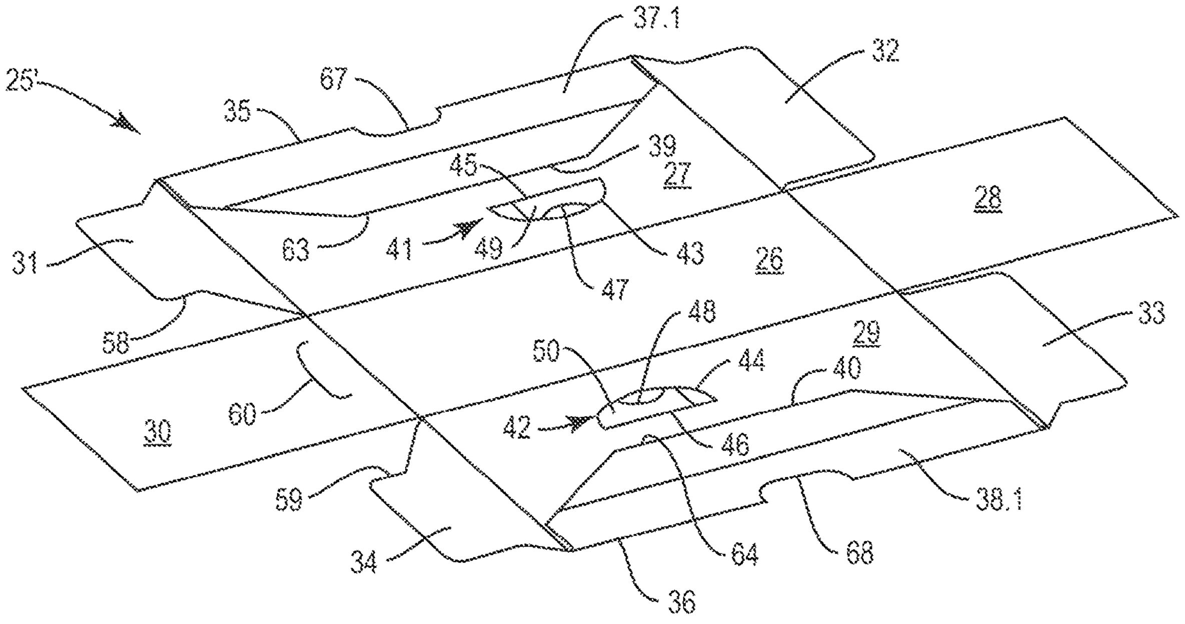
FIG. 5 is a perspective view of a folded second blank formed from the second blank of FIG. 4 according to exemplary embodiments of the disclosure.

In a first processing step for forming the outer construct 65 (FIGS. 6-9) from the second blank 25, the distal sections 37.2, 38.2 of the outer locking tabs 37, 38 can be folded against and secured (e.g., adhesively bonded) to the respective proximal sections 37.1, 38.1 of the outer locking tabs 37, 38. Further, the outer proximal sections 37.1, 38.1 can be folded against the inner sides of the respective outer side panels 27, 29 and the distal sections 33.2, 34.2 can be secured (e.g., adhesively bonded) to the inner sides of the outer side panels 27, 29. Accordingly, the distal sections 37.2, 38.2 can be secured between the respective proximal portions 37.1, 38.1 and the respective outer side panels 27, 29. Alternatively, the proximal portions 37.1, 38.1 can be disposed between the respective outer side panels 27, 29 and the respective distal sections 37.2, 38.2 and secured to the outer side panels 27, 29. In the illustrated embodiments, the folded outer locking tabs 37, 38 can form first outer locking edges 63, 64 along the respective lateral fold lines 39, 40 and positioned between the respective engagement devices 41, 42 and the respective lateral fold lines 35, 36 (FIG. 5). As shown in FIGS. 5-9, the engagement openings 54, 55 are formed into respective engagement recesses or cutouts 67, 68 in the outer construct 65 when the outer locking tabs 37, 38 are folded against the inner sides of the outer side panels 27, 29. In embodiments, the engagement recesses 67, 68 can have the shape of half an oval and can extend along the lower edges of the outer side panels 27, 29. In exemplary embodiments, the outer locking tabs 37, 38 can be folded and glued to the respective outer side panels 27, 29 (e.g., by a packaging manufacturer) and then stored and/or transported (e.g., to a packer) in a flat, glued blank configuration 25' (FIG. 5), such as in stacks with other similar or identical blanks and/or with the first blanks 1, 1'.

Figure 6:
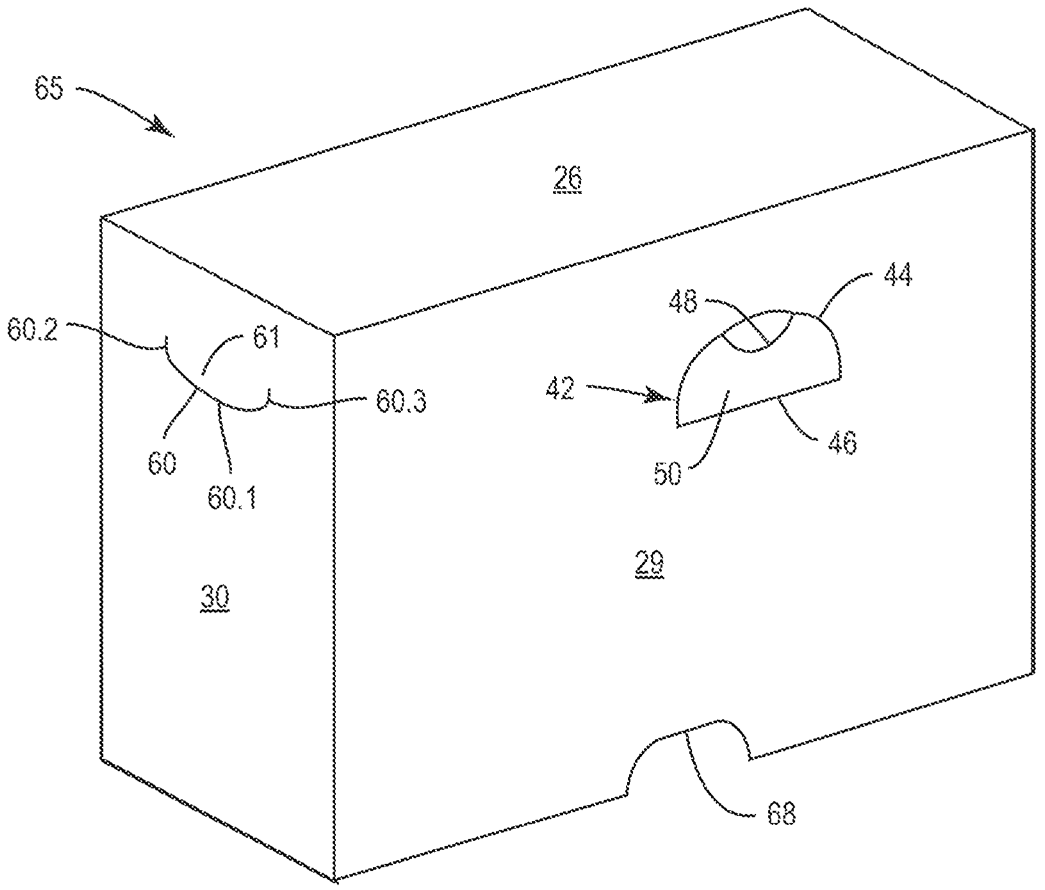
FIG. 6 is a perspective view of the outer construct formed from the second blank of FIG. 4 and the folded second blank of FIG. 5 according to exemplary embodiments of the disclosure.

As shown in FIGS. 6-9, the erected outer construct 65 can be formed from the flat, glued blank 25' (e.g., by a folder-gluer system, a packer, etc.) by folding the outer side panels 27, 29 along the lateral fold lines 26.1, 26.3 to extend downwardly from the top panel 26, folding the outer end flaps 31, 34 and 32, 33 along the respective longitudinal fold lines 27.1, 29.2 and 27.2, 29.1 over the respective ends of the outer construct 65, and folding the outer end panels 30, 28 along the respective longitudinal fold lines 26.4, 26.2 over the respective ends of the outer construct 65. In the illustrated embodiments, the outer side end flaps 31, 32, 33, 34 can be folded to extend between the outer side panels 27, 29, perpendicular to the outer side panels 27, 29. In embodiments, the first outer end panel 28 can overlap and can be secured (e.g., adhered) to the outer side end flaps 32, 33 to form a first outer end wall, and the second outer end panel 30 can overlap and can be secured (e.g., adhered) to the outer side end flaps 31, 34 to form a second outer end wall. As shown in FIGS. 6-9, the top panel 26, the outer panels 27, 28, 29, 30, and the outer end flaps 31, 32, 33, 34 can extend at least partially around a second interior of the outer construct 65, wherein the inner construct 21 is at least partially received in the second interior of the outer construct 65 when the carton 69 is in its closed configuration. In the illustrated embodiments, erected outer construct 65 can have a second or outer opening 66, and the inner construct 21 can be movable into and out of the second interior of the outer construct 65 through the second opening 66 when the locking features are disengaged from one another as described in more detail below. As shown in FIGS. 6 and 7, the first outer locking edges 63, 64 can face away from the outer opening 66 and toward the top panel 26 and can be spaced apart from the outer opening 66 and the top panel 26.

As shown in FIGS. 6 and 7, the first engagement devices 41, 42 are arranged in the outer side panels 27, 29 on opposite sides of a vertical cross-sectional plane that is oriented perpendicular to the outer side panels 27, 29 and that extends along the center of the outer side panels 27, 29 (e.g., corresponding to the center axis 53 of FIG. 4). In embodiments, the center of the outer side walls 27, 29 can be formed by the geometric center of gravity of the outer construct 65. As shown in FIG. 7, the slot 60 can be positioned in the outer end panel 30 to be spaced upwardly (e.g., closer to the top panel 26) from the second outer locking edges 58, 59. The outer construct 65 could be otherwise formed without departing from the disclosure.

Figure 8:
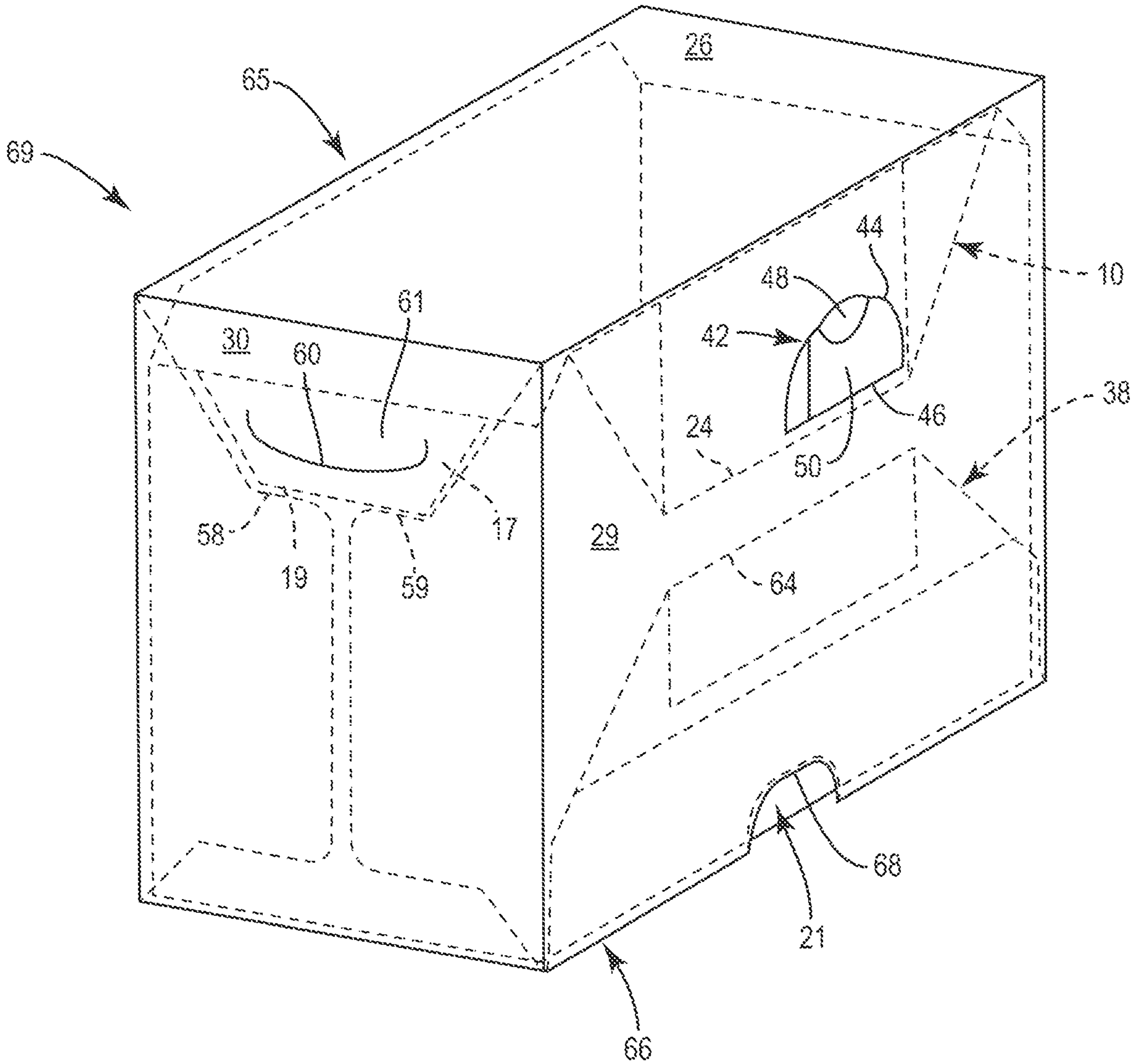
FIG. 8 is a perspective view of the carton formed by assembling the inner construct and the outer construct of FIG. 7 showing select hidden features of the constructs in broken lines according to exemplary embodiments of the disclosure.

FIG. 7 shows the constructs 21, 65 in a separated or open configuration (e.g., so that the first opening 22 of the inner construct 21 is accessible for loading and/or removing items from the inner construct 21). In the illustrated embodiments, the second opening 66 of the outer construct 65 is aligned with the first opening 22 of the inner construct 21 in preparation for assembling the carton 69 in its closed configuration (FIG. 8). In embodiments, FIGS. 7-9 show select internal or otherwise hidden aspects of the constructs 21, 65 in broken lines. When the outer construct 65 is moved onto the inner construct 21 to assemble the carton 69 in its closed configuration, the first outer locking edges 63, 64 of the outer construct 65 move past the first inner locking edges 23, 24 of the inner construct 21 so that the first outer locking edges 63, 64 are arranged below the first inner locking edges 23, 24 (FIGS. 8 and 9). In embodiments, the insertion of the outer construct 65 onto the inner construct 21 can be facilitated by the upper trapezoidal sections 3.2, 5.2 of the inner side panels 3, 5. As shown in FIGS. 8 and 9, when the carton 69 is in its closed configuration, the inner locking edges 23, 24 of the inner construct 21 face away from the top panel 26 of the outer construct 65 and are spaced apart from the top panel 26, and the first outer locking edges 63, 64 of the outer construct 65 face away from the bottom panel 2 of the inner construct 21 and are spaced apart from the bottom panel 2. In embodiments, the carton 69 could be assembled by moving the outer construct 65 onto the inner construct 21, moving the inner construct 21 into the outer construct 65, or moving both constructs 21, 65 together.

As shown in FIG. 8, the carton 69 is in a fully closed configuration with the inner construct 21 received in the interior of the outer construct 65 so that the first outer locking edges 63, 64 are spaced apart from the first inner locking edges 23, 24 (e.g., wherein the inner construct 21 is partially or fully contained within the outer construct 65 with the first opening 22 covered by the outer construct 65). Further, as shown in FIG. 8, the second outer locking edges 58, 59 of the side end flaps 31, 34 of the outer construct 65 are positioned below the second inner locking edge 19 of the second locking tab 17 of the inner construct 21. In embodiments, the second inner locking tab 18 is positioned between the inner end panel 4 and the outer side end flaps 32, 33 in the carton 69 and the second inner locking edge 20 does not engage a locking edge of the outer construct 65. However, the inner construct 21 could be rotated 180 degrees about its vertical axis (e.g., so that the inner end panels 4, 6 are adjacent the respective outer end panels 30, 29 when the inner construct 21 is inserted into the outer construct 65) and the second inner locking edge 20 of the second inner locking tab 18 can engage the second outer locking edges 58, 59 of the outer construct 65 when the carton 69 is in its closed configuration. In this orientation, the first inner locking edges 23, 24 of the first inner locking tabs 9, 10 can be aligned for engagement with the respective first outer locking edges 64, 63 of the first outer locking tabs 38, 37.

In the illustrated embodiments, the carton 69 can be locked in its closed configuration, e.g., due to the position of the second outer locking edges 58, 59 below the second inner locking edge 19 (or 20) so that the second inner locking edge 19 faces the second outer locking edges 58, 59 and/or due to the position of the first outer locking edges 63, 64 below and facing the first inner locking edges 23, 24. For example, in an attempt to pull the outer construct 65 away from the inner construct 21, the second inner locking edge 19 can engage (e.g., can contact, be supported on, abut, interact with, etc.) the second outer locking edges 58, 59 to resist and/or prevent movement of the constructs 21, 65 relative to one another. In embodiments, the constructs 21, 65 can move slightly relative to one another until the second locking edges 19 and 58, 59 abut, locking the carton 69 and preventing further relative movement of the constructs 21, 65. In embodiments, the abutment of the second inner locking edge 19 against the second outer locking edges 58, 59 can limit or prevent relative movement between the constructs 21, 65 to limit or prevent undesired extraction of the inner construct 21 from the opening 66 of the outer construct 65. Accordingly, in embodiments, the second inner locking tab 17 can engage the outer side end flaps 31, 34 (e.g., along the second locking edges 19 and 58, 59) so that these second locking features cooperate to limit movement of the inner construct 21 relative to the outer construct 65. The carton 69 could be otherwise formed and/or erected without departing from the disclosure.

In exemplary embodiments, the locking engagement between the second inner locking tab 17 and the second outer locking edges 58, 59 can be overcome by pressing the bending tab 61 inwardly to engage the second inner locking tab 17 (e.g., to press the inner locking tab 17 inwardly against the inner end panel 6 and/or to bend the inner locking tab 17 and the inner end panel 6 inwardly). Moving the second inner locking tab 17 inwardly can disengage the second inner locking edge 19 from the second outer locking edges 58, 59 (e.g., move the inner locking edge 19 out of alignment with the outer locking edges 58, 59) so that the locking edges 19, 58, 59 no longer prevent relative movement of the constructs 21, 65. This initial unlocking of the carton 69 can be carried out by a user by gripping the outer construct 65 with a first hand, pressing the bending tab 61 with the index finger of that first hand, gripping the inner construct 21 at the engagement recesses 67, 68 in the outer construct with the thumb and index finger of their second hand, and pulling the constructs 21, 65 apart. Since the bending tab 61 is pressed inwardly to disengage the locking edges 19 and 58, 59, the pulling of the constructs 21, 65 results in relative movement between the constructs until the first inner locking edges 23, 24 engage (e.g., contact, be supported on, abut, interact with, etc.) the first outer locking edges 63, 64 (FIG. 9), which can stop or resist the relative movement of the constructs 21, 65 in the direction of pulling the constructs 21, 65 apart. In embodiments, the abutment of the first inner locking edges 23, 24 against the respective first outer locking edges 63, 64 can limit or prevent relative movement between the constructs 21, to limit or prevent undesired extraction (e.g., further extraction) of the inner construct 21 from the opening 66 of the outer construct 65. Accordingly, in embodiments, the first inner locking tabs 9, 10 can engage the respective first outer locking tabs 37, 38 (e.g., along the respective locking edges 23, 24 and 63, 64) so that the locking tabs 9, 10, 37, 38 cooperate to limit further movement of the inner construct 21 relative to the outer construct 65. In embodiments, the carton 69 is shown in a first closed configuration in FIG. 8 and in a second closed configuration in FIG. 9, wherein the inner construct 21 is partially removed from the interior of the outer construct 65 with the inner construct 21 extending partially through the second opening 66.

In the illustrated embodiments, the carton 69 can be further unlocked and opened from the intermediate configuration (e.g., partially open and unlocked configuration) of FIG. 9 by disengaging the first inner locking edges 23, 24 from the first outer locking edges 63, 64 and further pulling the constructs 21, 65 apart. In exemplary embodiments, the carton 55 can be manipulated to overcome the locking engagement of the inner locking tabs 9, 10 with the outer locking tabs 37, 38 so that the inner construct 21 can be moved from the intermediate (e.g., partially unlocked) position of FIG. 9 to the open, separated position (e.g., wherein the inner construct 21 is removed from the outer construct 65 through the opening 66 so that the first opening 22 is accessible, which can be similar to the configuration shown in FIG. 7). For example, the covers 49, 50 of the engagement devices 41, 42 can be at least partially separated from the respective outer side panels 27, 29 along the respective weakening lines 43, 44 (e.g., by grasping the covers 49, 50 at the access openings 47, 48) and can be folded outwardly and downwardly along the respective fold lines 45, 46 to form engagement holes 52 in the respective outer side panels 27, 29. As shown in FIG. 9, the cover 50 is fully removed to show the engagement hole 52 in the outer side panel 29; however, the cover 50 could remain attached to the outer side panel 29 along the fold line 46. In the illustrated embodiments, the inner locking tabs 9, 10 of the inner construct 21 are accessible through the engagement holes 52 formed by the respective engagement devices 41, 42 in the outer construct 65. In the illustrated embodiments, a user can grip the engagement holes 52 in the outer side panels 27, 29 (e.g., with the thumb and index finger of one hand) and press the inner locking tabs 9, 10 inwardly, causing the first inner locking edges 23, 24 to move inwardly and away from (out of alignment with) the first outer locking edges 63, 64. When the inner locking tabs 9, 10 of the inner construct 21 are pressed inwardly in this way, the first outer locking edges 63, 64 of the outer construct 65 are no longer blocked by the first inner locking edges 23, 24 of the inner construct 21.

While engaging the inner locking tabs 9, 10 via the engagement holes 52 formed by the engagement devices 41, 42, the user can grip the inner construct 21 via the engagement recesses 67, 68 in the outer construct 65 (e.g., with the thumb and index finger of the other hand). The user can pull the constructs 21, 65 apart with both hands while pressing inwardly on the inner locking tabs 9, 10 via the engagement holes 52 formed in the outer construct 65 and by pulling on the inner construct 21 via the engagement recesses 67, 68 in the outer construct 65. In embodiments, it is difficult or impossible for a child to carry out the unlocking and opening operation (e.g., due to limitations in hand size and/or dexterity).

In the illustrated embodiments, once the constructs 21, 65 are separated (e.g., similar as shown in FIG. 7), the opening 22 of the inner construct 21 is accessible for removing or adding items. The carton 69 could be reclosed and/or reopened according to the assembling and unlocking/separating operations as described above. In embodiments, the reclosed carton 69 is again protected against unwanted opening (e.g., by children) by the locking engagement of the second inner locking edge 19 with the second outer locking edges 58, 59 and/or of the first inner locking tabs 9, 10 with the respective first outer locking tabs 37, 38 once the inner construct 21 is fully inserted into the outer construct 65.

In exemplary embodiments, the unlocking of the carton 69 is difficult or impossible for a child at least because the sequences of unlocking the constructs 21, 65 from one another are too complicated and the gripping of the carton 69 for the unlocking operations is difficult or impossible due to lack of size and/or dexterity in children. For example, the shortest distance of the engagement features 41, 42 and/or the engagement recesses 67, 68 from each other along the outer sides of the carton 69 in its closed or partially closed configuration is dimensioned such that it is difficult or impossible for a child (e.g., with an age of up to three years, of up to four years, of up to 51 months, of up to five years, of up to six years, etc.) to unlock the carton 69, and it is difficult or impossible to pull the outer construct 65 and inner construct 21 apart when in the locked configuration. In embodiments, this dimensioning is based on average body measurements of a child, regardless of gender, in the respective age group, in the EU and/or in North America, depending on the region for which the carton 69 is intended. In examples, the distance between the outer sides of the second side walls can be about 50 to about 120 mm, about 70 to about 100 mm, about 60 to about 90 mm, about 80 to about 90 mm, or about 70 to about 80 mm. This can help ensure that a child's hands cannot engage in all the engagement holes simultaneously in order to unlock the folding carton, while an adult (e.g., who may have larger hands and/or more dexterity) is able to reach the locking features to unlock and open the carton 69.

In the carton 55 according to the present disclosure, the second inner locking tab 17 or 18 and the outer side end flaps 31, 34 and the first inner locking tabs 9, 10 and the first outer locking tabs 37, 38 form multiple interlocks when the inner construct 21 is moved into the outer construct 65. This can be because the second inner locking edge 19 or 20 can bear against the second outer locking edges 58, 59 and/or the second inner locking edges 23, 24 can bear against the second outer locking edges 63, 64 so that they prevent the inner construct 21 from being pulled out of the outer construct 65. Pulling the inner construct 21 out of the outer construct 65 can require, for example, that the multiple interlocks between the outer construct and the inner construct be released in the appropriate sequence. To do this, the user can use the thumb and index finger of one hand or an unlocking tab (key) to engage the bending tab 61 in the outer construct 65 to move the second inner locking tab 17 out of alignment with the second outer locking edges 58, 59 and then the engagement holes 52 in the outer construct 65 to compress the first inner locking tabs 9, 10 slightly so that the first outer locking edges 63, 64 no longer block the path of the first inner locking edges 23, 24. With the thumb and index finger of the other hand, the user can grip a portion of the inner construct 21 (e.g., along or adjacent the bottom panel 2) through the second engagement openings/recesses 67, 68 and pull the inner construct 21 and outer construct 65 apart while pressing the bending tab 61 and then engaging the engagement holes 52. In doing so, the second inner locking tab 17 slide past the second outer locking edges 58, 59 and then the first inner locking tabs 9, 10 slide past the user's thumb and index finger that engage the first engagement apertures 52 and compress the first locking tabs 9, 10 slightly. Unlocking by a child may be prevented or made difficult by sizing the carton so that the child, due to the comparatively small size of the child's hands, is not able to engage in the engagement openings 45, 46 in the manner described. Unlocking can require, for example, a certain understanding of the function of the latches, which is usually not yet present in a child up to the age of six, for example. Further, the multiple steps in the unlocking operations make opening by a child more difficult even when the child is mimicking an adult. As a result, a child is prevented from unlocking the carton 69 according to the disclosure and is protected from the associated dangers. In addition, the carton 69 is protected against unintentional opening, which can occur with an everting carton that does not include the locking features, for example, if it is lifted at the outer construct without supporting the inner construct so that the inner construct slips out of the outer construct in the absence of the locking features.

In embodiments of the carton 69 according to the disclosure, opening protection can be provided by the cover panels 49, 50, which can prevent or resist partial compression of the inner locking tabs 9, 10 so that the inner locking tabs 9, 10 are not disengaged from the outer locking tabs 37, 38. For example, only by tearing along the weakening lines 43, 44 to at least partially remove the cover panels 49, 50 and form the engagement openings 52 is it possible to compress the inner locking tabs 9, 10 to open the carton 69 for the first time. In exemplary embodiments, the cover panels 49, 50 in the outer side panels 27, 29 of the outer construct 65 can be glued to the inner construct 21 (e.g., to the respective inner locking tabs 9, 10), which further can help resist or prevent opening of the carton 69 until the cover panels 49, 50 are at least partially separated from the outer side panels 27, 29. In addition, the package is prevented from being opened prior to purchase by an interested consumer. For example, tearing of the lines of weakening 43, 44 and/or other tearing of the carton 69 from attempts to force the carton open can provide a potential purchaser an indication that the package has been accessed or tampered with (e.g., wherein products may have been removed from the carton 69 and/or other objects may have been inserted into the carton 69).

In exemplary embodiments, an additional protection against opening (e.g., by children) can be provided by the offsetting of the engagement devices 41, 42. For example, when the offset engagement devices 41, 42 are engaged to press against the first inner locking tabs 9, 10 of the inner construct 21, a torque is exerted on the carton 69 since the forces applied are offset from the centerline of the carton and from one another. This torque can reduce the forces moving the first inner locking tabs 9, 10 inwardly relative to the first outer locking tabs 37, 38, which can make disengaging the first inner locking tabs 9, 10 from the first outer locking tabs 37, 38 more difficult. In embodiments, an adult can prevent (e.g., substantially prevent) the carton 69 from yielding to the pressure by the thumb and index finger of their first hand on the first inner locking tabs 9, 10 via the offset engagement devices 41, 42 by applying a counter torque with their second hand while pulling the inner construct 21 out of the interior of the outer construct 65. This operation is not possible or is difficult for a child to perform due to a lack of knowledge of how to carry it out and/or due to having smaller hands. In embodiments, the engagement devices 41, 42 can be offset from a vertical cross-sectional plane of the carton 69 and/or a horizontal cross-sectional plane of the carton 60. Further, the cross-sectional plane can be on a centerline of the carton 69 or could be positioned anywhere along the carton. In exemplary embodiments, each of the first and second engagement devices 41, 42 is offset from the centerline of the first blank 1 and the inner construct 21 by a distance of about 15 to 35 mm, of about 20 to 30 mm, of about 25 mm, or any suitable distance.

The protection against access to the interior of the carton 69 by children can be beneficial due, at least in part, to increased demands placed on child safety. Packages for certain uses may be tested in certain jurisdictions (e.g., the United States and/or other countries) for whether children (e.g., at an age of 42 to 51 months) are able to open the package over certain time periods. For example, in a certain test, children may be given five minutes to open the package without any help and then may be given five minutes to open the package after the first opening protection has been overcome. In embodiments, the present disclosure can provide better protection against opening by children up to an age of about 51 months, for example.

In exemplary embodiments, the carton 69 may have tolerances in its formation, for example, when the constructs 21, 65 are formed from the flat, glued blanks 1', 25' by a packager. These tolerances may lead to small variations in the relative sizes of the constructs 21, 65. However, the two layers of thickness of the inner locking tabs 9, 10 and of the outer locking tabs 37, 38 (e.g., where their respective proximal and distal portions are in overlapping relationships) can help compensate for such tolerances and variations that can occur during the production of the blanks and the erection and bonding of the inner construct and/or the outer construct. This can be advantageous for secure locking of the carton despite the tolerances.

While the present disclosure references the first inner locking tabs 9, 10, the second inner locking tabs 17, 18, the first outer locking tabs 37, 38, and the second outer locking tabs (e.g., defined by the outer side end flaps 31, 34, as noted above), any suitable ordinals can be associated with any of the inner and outer locking tabs. In one example, the inner locking tabs 9, 17, and 10 can be a first inner locking tab, a second inner locking tab, and a third inner locking tab, respectively, and the outer locking tabs 37, 31, and 38 can be a first outer locking tab, a second outer locking tab, and a third outer locking tab, respectively. In another embodiment, the inner locking tabs 9, 17, and 18 can be a first inner locking tab, a second inner locking tab, and a third inner locking tab, respectively, and the outer locking tabs 37, 31, and 34 can be a first outer locking tab, a second outer locking tab, and a third outer locking tab, respectively.

The blanks according to any of the embodiments of the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the carton to function at least generally as described herein. The blank can also be laminated or coated with one or more sheet-like materials at selected panels or panel sections.

In accordance with the exemplary embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton comprising:

an inner construct comprising a plurality of inner panels extending at least partially around a first interior of the inner construct, wherein the inner construct comprises at least a first inner locking tab and a second inner locking tab; and an outer construct comprising a plurality of outer panels extending at least partially around a second interior of the outer construct, the inner construct being at least partially received in the second interior of the outer construct, wherein the outer construct comprises at least a first outer locking tab and a second outer locking tab;

wherein the second inner locking tab and the second outer locking tab cooperate to limit movement between the inner construct and the outer construct in a closed configuration of the carton, and, when the second inner locking tab has been disengaged from the second outer locking tab, one or both of the inner construct and the outer construct are movable from the closed configuration of the carton to an intermediate configuration in which the first inner locking tab and the first outer locking tab cooperate to limit movement between the inner construct and the outer construct, the plurality of inner panels comprises at least a first inner side panel, a second inner side panel, a first inner end panel, and a second inner end panel, the first inner locking tab is foldably connected to the first inner side panel and the second inner locking tab is foldably connected to the first inner end panel of the plurality of inner panels, the inner construct further comprises a third inner locking tab foldably connected to the second inner end panel of the plurality of inner panels opposite to the first inner end panel, and the third inner locking tab is spaced apart from the second outer locking tab.

2. The carton of claim 1, wherein the first inner side panel and the first inner end panel are perpendicular to one another.

3. The carton of claim 1, wherein the plurality of outer panels comprises at least a first outer panel and a second outer panel, and wherein the first outer locking tab is foldably connected to the first outer panel and the second outer locking tab is foldably connected to at least one of the first outer panel and the second outer panel.

4. The carton of claim 1, further comprising an engagement feature extending in a first outer panel of the plurality of outer panels and a bending tab extending in a second outer panel of the plurality of outer panels, wherein the first inner locking tab of the inner construct is at least partially aligned with the engagement feature in the first outer panel and the second inner locking tab of the inner construct is at least partially aligned with the bending tab in the second outer panel.

5. The carton of claim 4, wherein the bending tab is configured to engage the second inner locking tab when the bending tab is pressed inwardly for moving the second inner locking tab with respect to the second outer locking tab for facilitating movement of the inner construct and the outer construct relative to one another from the closed configuration to the intermediate configuration.

6. The carton of claim 5, wherein the first inner locking tab of the inner construct extends along the engagement feature in the first outer panel so that the first inner locking tab can be engaged via the engagement feature for moving the first inner locking tab with respect to the first outer locking tab for facilitating movement of the inner construct and the outer construct relative to one another from the intermediate configuration to an open configuration.

7. The carton of claim 1, wherein:

the first inner locking tab comprises an inner proximal section foldably connected to the first inner side panel of the plurality of inner panels and an inner distal section foldably connected to the inner proximal section along a first fold line, the inner distal section being folded along the first fold line into face-to-face contact with the inner proximal section, at least one of the inner proximal section and the inner distal section being attached to the first inner side panel;

the first outer locking tab comprises an outer proximal section foldably connected to an outer panel of the plurality of outer panels and an outer distal section foldably connected to the outer proximal section along a second fold line, the outer distal section being folded along the second fold line into face-to-face contact with the outer proximal section, at least one of the outer proximal section and the outer distal section being attached to the outer panel; and the first fold line of the first inner locking tab and the second fold line of the first outer locking tab engage one another for resisting movement between the inner construct and the outer construct in the intermediate configuration of the carton.

8. A carton comprising:

an inner construct comprising a plurality of inner panels extending at least partially around a first interior of the inner construct, wherein the inner construct comprises at least a first inner locking tab and a second inner locking tab; and an outer construct comprising a plurality of outer panels extending at least partially around a second interior of the outer construct, the inner construct being at least partially received in the second interior of the outer construct, wherein the outer construct comprises at least a first outer locking tab and a second outer locking tab;

wherein the second inner locking tab and the second outer locking tab cooperate to limit movement between the inner construct and the outer construct in a closed configuration of the carton, and, when the second inner locking tab has been disengaged from the second outer locking tab, one or both of the inner construct and the outer construct are movable from the closed configuration of the carton to an intermediate configuration in which the first inner locking tab and the first outer locking tab cooperate to limit movement between the inner construct and the outer construct, wherein the plurality of inner panels comprises at least a first inner panel and a second inner panel, and wherein the first inner locking tab is foldably connected to the first inner panel and the second inner locking tab is foldably connected to the second inner panel, and the plurality of outer panels comprises at least a first outer panel and a second outer panel, and wherein the first outer locking tab is foldably connected to the first outer panel, the second outer locking tab is foldably connected to the first outer panel, the first outer locking tab and the first outer panel are in an overlapping relationship, and the second outer locking tab and the second outer panel are in an overlapping relationship.

9. The carton of claim 8, wherein the first inner locking tab is in an overlapping relationship with the first inner panel and the second inner locking tab is in an overlapping relationship with the second inner panel.

10. A carton comprising:

an inner construct comprising a plurality of inner panels extending at least partially around a first interior of the inner construct, wherein the inner construct comprises at least a first inner locking tab and a second inner locking tab; and an outer construct comprising a plurality of outer panels extending at least partially around a second interior of the outer construct, the inner construct being at least partially received in the second interior of the outer construct, wherein the outer construct comprises at least a first outer locking tab and a second outer locking tab;

wherein the second inner locking tab and the second outer locking tab cooperate to limit movement between the inner construct and the outer construct in a closed configuration of the carton, and, when the second inner locking tab has been disengaged from the second outer locking tab, one or both of the inner construct and the outer construct are movable from the closed configuration of the carton to an intermediate configuration in which the first inner locking tab and the first outer locking tab cooperate to limit movement between the inner construct and the outer construct, wherein the inner construct further comprises a third inner locking tab opposite to the first inner locking tab, the outer construct further comprises third outer locking tab opposite to the first outer locking tab, and the third inner locking tab and the third outer locking tab cooperate to limit movement between the inner construct and the outer construct when the carton is in the intermediate configuration.

11. The carton of claim 10, further comprising a first engagement feature extending in a first outer side panel of the plurality of outer panels and a second engagement feature extending in a second outer side panel of the plurality of outer panels, the second outer side panel being opposite to the first outer side panel, wherein the first inner locking tab extends along the first engagement feature, the third inner locking tab extends along the second engagement feature, and the first engagement feature and the second engagement feature are for being engaged for moving the first inner locking tab and the third inner locking tab relative to the first outer locking tab and the third outer locking tab for facilitating movement of the inner construct and the outer construct relative to one another.

12. The carton of claim 11, wherein the first engagement feature and the second engagement feature are offset from one another in a direction parallel to the first outer side panel and the second outer side panel.

13. The carton of claim 11, further comprising a bending tab extending in an outer end panel of the plurality of outer panels, wherein the second inner locking tab of the inner construct is at least partially aligned with the bending tab in the second outer panel, and wherein the bending tab is configured to engage the second inner locking tab when the bending tab is pressed inwardly for moving the second inner locking tab with respect to the second outer locking tab for facilitating movement of the inner construct and the outer construct relative to one another.

14. In combination, a first blank and a second blank for cooperating to at least partially form a carton, the first blank comprising a plurality of inner panels, a first inner locking tab, and a second inner locking tab, wherein the first blank is for forming an inner construct; and the second blank comprising a plurality of outer panels, a first outer locking tab, and a second outer locking tab, wherein the second blank is for forming an outer construct for at least partially receiving the inner construct formed from the first blank when the carton is formed from the first blank and the second blank, wherein the second inner locking tab and the second outer locking tab are configured for selectively cooperating to limit movement between the inner construct formed from the first blank and the outer construct formed from the second blank when the carton formed from the first blank and the second blank is in a closed configuration, and wherein the first inner locking tab and the first outer locking tab are configured for selectively cooperating to limit movement between the inner construct formed from the first blank and the outer construct formed from the second blank when the carton formed from the first blank and the second blank is in an intermediate configuration, the first blank further comprises a third inner locking tab opposite to the first inner locking tab, the second blank further comprises third outer locking tab opposite to the first outer locking tab, and the third inner locking tab and the third outer locking tab are configured for cooperating to limit movement between the inner construct formed from the first blank and the outer construct formed from the second blank when the carton formed from the first blank and the second blank is in the intermediate configuration.

15. The combination of claim 14, wherein the plurality of inner panels comprises at least a first inner panel and a second inner panel, and wherein the first inner locking tab is foldably connected to the first inner panel and the second inner locking tab is foldably connected to the second inner panel.

16. The combination of claim 15, wherein the plurality of inner panels further comprises a bottom panel, and wherein the first inner panel and the second inner panel are foldably connected to the bottom panel along respective fold lines that are perpendicular to one another.

17. The combination of claim 15, wherein the plurality of outer panels comprises at least a first outer panel and a second outer panel, and wherein the first outer locking tab is foldably connected to the first outer panel and the second outer locking tab is foldably connected to at least one of the first outer panel and the second outer panel.

18. The combination of claim 15, wherein the plurality of outer panels comprises at least a first outer panel and a second outer panel, and wherein the first outer locking tab is foldably connected to the first outer panel, the second outer locking tab is foldably connected to the first outer panel, the first outer locking tab and the first outer panel are for being in an overlapping relationship when the outer construct is formed from the second blank, and the second outer locking tab and the second outer panel are for being in an overlapping relationship when the outer construct is formed from the second blank.

19. The combination of claim 18, wherein the first inner locking tab is for being in an overlapping relationship with the first inner panel when the inner construct is formed from the first blank and the second inner locking tab is for being in an overlapping relationship with the second inner panel when the inner construct is formed from the first blank.

20. The combination of claim 14, further comprising an engagement feature extending in a first outer panel of the plurality of outer panels and a bending tab extending in a second outer panel of the plurality of outer panels, wherein the first inner locking tab of the inner construct is for being at least partially aligned with the engagement feature in the first outer panel and the second inner locking tab of the inner construct is for being at least partially aligned with the bending tab in the second outer panel when the carton is formed from the first blank and the second blank.

21. The combination of claim 14, further comprising a first engagement feature extending in a first outer side panel of the plurality of outer panels and a second engagement feature extending in a second outer side panel of the plurality of outer panels, the second outer side panel being opposite to the first outer side panel in the second blank, wherein, when the carton is formed from the first blank and the second blank, the first inner locking tab is for extending along the first engagement feature, the third inner locking tab is for extending along the second engagement feature, and the first engagement feature and the second engagement feature are for being engaged for moving the first inner locking tab and the third inner locking tab relative to the first outer locking tab and the third outer locking tab for facilitating movement of the inner construct formed from the first blank and the outer construct formed from the second blank relative to one another.

22. The combination of claim 21, wherein the second blank comprise a centerline extending through a center of each of the first outer side panel and the second outer side panel, and the first engagement feature and the second engagement feature are off set from one another in a direction perpendicular to the centerline.

23. The combination of claim 21, further comprising a bending tab extending in an outer end panel of the plurality of outer panels, wherein the second inner locking tab of the first blank is for being at least partially aligned with the bending tab in the second outer panel when the carton is formed from the first blank and the second blank.

24. The combination of claim 14, wherein the second inner locking tab is foldably connected to a first inner end panel of the plurality of inner panels, the first blank further comprises a third inner locking tab foldably connected to a second inner end panel of the plurality of inner panels opposite to the first inner end panel.

25. A method of forming a carton, the method comprising:

obtaining a first blank comprising a plurality of inner panels, a first inner locking tab, a second inner locking tab, and a third inner locking tab, the plurality of inner panels comprises at least a first inner side panel, a second inner side panel, a first inner end panel, and a second inner end panel, the second inner locking tab is foldably connected to the first inner end panel of the plurality of inner panels and the third inner locking tab is foldably connected to the second inner end panel of the plurality of inner panels, the first inner locking tab is foldably connected to the first inner side panel;

forming an inner construct from the first blank by folding the plurality of inner panels at least partially around a first interior of the inner construct and positioning the second inner end panel opposite the first inner end panel;

obtaining a second blank comprising a plurality of outer panels, a first outer locking tab, and a second outer locking tab;

forming an outer construct from the second blank by folding the plurality of outer panels at least partially around a second interior of the outer construct;

moving at least one of the inner construct and the outer construct relative to the other to assemble the carton with the inner construct at least partially received in the second interior of the outer construct, wherein the second inner locking tab and the second outer locking tab cooperate to limit movement between the inner construct and the outer construct in a closed configuration of the carton, and, when the second inner locking tab has been disengaged from the second outer locking tab, one or both of the inner construct and the outer construct are movable from the closed configuration of the carton to an intermediate configuration in which the first inner locking tab and the first outer locking tab cooperate to limit movement between the inner construct and the outer construct.

26. The method of claim 25, wherein the forming the outer construct further comprises positioning the first inner side panel and the first inner end panel to be perpendicular to one another.

27. The method of claim 26, wherein the plurality of outer panels comprises at least a first outer panel and a second outer panel, the first outer locking tab is foldably connected to the first outer panel, and the second outer locking tab is foldably connected to the first outer panel, and wherein the forming the outer construct further comprises arranging the first outer locking tab and the first outer panel in an overlapping relationship and arranging the second outer locking tab and the second outer panel in an overlapping relationship.

28. The method of claim 25, wherein the moving at least one of the inner construct and the outer construct relative to the other to assemble the carton comprises positioning the first inner locking tab and the first outer locking tab to be spaced apart from one another, and wherein the first inner locking tab and the first outer locking tab are in an abutting relationship when the carton is in the intermediate configuration.

29. The method of claim 25, further comprising an engagement feature extending in a first outer panel of the plurality of outer panels and a bending tab extending in a second outer panel of the plurality of outer panels, wherein the moving at least one of the inner construct and the outer construct relative to the other to assemble the carton comprises positioning the first inner locking tab of the inner construct to be at least partially aligned with the engagement feature in the first outer panel and positioning the second inner locking tab of the inner construct to be at least partially aligned with the bending tab in the second outer panel.

30. The method of claim 25, wherein:

the first inner locking tab comprises an inner proximal section foldably connected to the first inner side panel of the plurality of inner panels and an inner distal section foldably connected to the inner proximal section along a first fold line, wherein the forming the inner construct comprises folding the inner distal section along the first fold line into face-to-face contact with the inner proximal section, folding the first inner locking tab into an overlapping relationship with the first inner side panel, and attaching at least one of the inner proximal section and the inner distal section to the inner panel;

the first outer locking tab comprises an outer proximal section foldably connected to an outer panel of the plurality of outer panels and an outer distal section foldably connected to the outer proximal section along a second fold line, wherein the forming the outer construct comprises folding the outer distal section along the second fold line into face-to-face contact with the outer proximal section, folding the first outer locking tab into an overlapping relationship with the outer panel, attaching at least one of the outer proximal section and the outer distal section to the outer panel; and the first fold line of the first inner locking tab and the second fold line of the first outer locking tab engage one another for resisting movement between the inner construct and the outer construct in the intermediate configuration of the carton.

* * * * *